United States Patent
Kumada et al.

(10) Patent No.: US 10,961,160 B2
(45) Date of Patent: Mar. 30, 2021

(54) FLUORIDE SINTERED BODY FOR NEUTRON MODERATOR AND METHOD FOR PRODUCING THE SAME

(71) Applicants: UNIVERSITY OF TSUKUBA, Ibaraki (JP); DAICO MFG CO., LTD., Kyoto (JP)

(72) Inventors: Hiroaki Kumada, Ibaraki (JP); Tetsuyuki Nakamura, Kyoto (JP); Takuji Shigeoka, Kyoto (JP); Takeshi Ikeda, Kyoto (JP)

(73) Assignees: UNIVERSITY OF TSUKUBA, Ibaraki (JP); DAICO MFG CO., LTD., Kyoto (JP)

( * ) Notice: Subject to any disclaimer, the term of this patent is extended or adjusted under 35 U.S.C. 154(b) by 375 days.

(21) Appl. No.: 14/405,585

(22) PCT Filed: May 27, 2014

(86) PCT No.: PCT/JP2014/064038
§ 371 (c)(1),
(2) Date: Dec. 4, 2014

(87) PCT Pub. No.: WO2015/005006
PCT Pub. Date: Jan. 15, 2015

(65) Prior Publication Data
US 2016/0002116 A1    Jan. 7, 2016

(30) Foreign Application Priority Data

Jul. 8, 2013 (JP) .............................. JP2013-142704

(51) Int. Cl.
*C04B 35/64* (2006.01)
*C04B 35/553* (2006.01)
(Continued)

(52) U.S. Cl.
CPC ............... *C04B 35/64* (2013.01); *C01F 5/28* (2013.01); *C04B 35/553* (2013.01);
(Continued)

(58) Field of Classification Search
CPC combination set(s) only.
See application file for complete search history.

(56) References Cited

U.S. PATENT DOCUMENTS 5,036,026 A * 7/1991 Yamakawa ........... C04B 35/581
501/100
5,597,495 A * 1/1997 Keil ..................... H01J 27/20
156/345.39
(Continued)

FOREIGN PATENT DOCUMENTS

EP      1 895 819       3/2008
EP      1895819 A1      3/2008
(Continued)

OTHER PUBLICATIONS

Kobelco, "What is Hot Isostatic Pressing (HIP)?", Jun. 2016, 4 pages, taken from https://web.archive.org/web/20160607212800/http://www.kobelco.co.jp/english/products/ip/technology/hip.html (Year: 2016).*

(Continued)

*Primary Examiner* — Ngoc-Yen Nguyen
(74) *Attorney, Agent, or Firm* — Wenderoth, Lind & Ponack, L.L.P.

(57) ABSTRACT

A fluoride sintered body suitable for a moderator which moderates high-energy neutrons so as to generate neutrons for medical care with which an affected part of the deep part of the body is irradiated to make a tumor extinct comprises $MgF_2$ of a compact polycrystalline structure having a bulk density of 2.90 g/cm$^3$ or more and as regards mechanical (Continued)

[Table 1]

| MgF$_2$ | | Neutron Flux after Moderation (n/cm²/sec) | | | Gamma Dose (Gy/h) | Mix Rate (Gy·cm²) | |
|---|---|---|---|---|---|---|---|
| Bulk Density (g/cm³) | Relative Density (%) | Fast Neutrons | Epithermal Neutrons | Thermal Neutrons | | Fast Neutrons | Gamma-rays |
| 3.055 | 97 | 3.03 E+08 | 2.78 E+09 | 0.98 E+08 | 0.38 | 5.32E-13 | 3.83E-14 |
| 2.990 | 95 | 3.28 E+08 | 2.83 E+09 | 1.01 E+08 | 0.37 | 5.73E-13 | 3.65E-14 |
| 2.900 | 92 | 3.53 E+08 | 2.88 E+09 | 1.04 E+08 | 0.35 | 6.12E-13 | 3.49E-14 |
| 2.835 | 90 | 3.82 E+08 | 2.91 E+09 | 1.08 E+08 | 0.34 | 6.70E-13 | 3.35E-14 | strengths, a bending strength of 10 MPa or more and a Vickers hardness of 71 or more.

7 Claims, 6 Drawing Sheets

(51) Int. Cl.
    *C04B 35/626*     (2006.01)
    *C01F 5/28*     (2006.01)
    *G21K 1/00*     (2006.01)
    *G21C 5/12*     (2006.01)

(52) U.S. Cl.
    CPC .... *C04B 35/6261* (2013.01); *C04B 35/62695* (2013.01); *G21K 1/00* (2013.01); *C04B 2235/3206* (2013.01); *C04B 2235/5436* (2013.01); *C04B 2235/604* (2013.01); *C04B 2235/656* (2013.01); *C04B 2235/658* (2013.01); *C04B 2235/6567* (2013.01); *C04B 2235/6583* (2013.01); *C04B 2235/661* (2013.01); *C04B 2235/77* (2013.01); *C04B 2235/95* (2013.01); *C04B 2235/96* (2013.01); *C04B 2235/9615* (2013.01); *G21C 5/12* (2013.01)

(56) References Cited

U.S. PATENT DOCUMENTS

| | | | | |
|---|---|---|---|---|
| 6,868,106 | B1 * | 3/2005 | Vogler | H01S 3/225 |
| | | | | 372/103 |
| 2010/0025594 | A1 * | 2/2010 | Nukatsuka | G01N 23/222 |
| | | | | 250/370.11 |
| 2016/0326062 | A1 * | 11/2016 | Furuya | A61N 5/10 |

FOREIGN PATENT DOCUMENTS

| | | |
|---|---|---|
| JP | 58-26072 | 2/1983 |
| JP | 2000-86344 | 3/2000 |
| JP | 2000-302553 | 10/2000 |
| JP | 2004-233168 | 8/2004 |
| JP | 2009-192488 | 8/2009 |
| JP | 2009-204428 | 9/2009 |
| JP | 2012-121776 | 6/2012 |
| JP | 2012-206913 | 10/2012 |
| WO | 94/29881 | 12/1994 |

OTHER PUBLICATIONS

Kobelco, "What is Cold Isostatic Pressing (CIP)?", Jun. 2016, 3 pages, taken from https://web.archive.org/web/20160607214026/https://www.kobelco.co.jp/english/products/ip/technology/cip.html (Year: 2016).*
Nakamura et al "Reappraisal of the optinal neutron energy characteric and spectrum for accelerator-based epithermal neutron source", 15th International congress on Neutron Capture Therapy, Sep. 2012, 19 pages (Year: 2012).*
Shirakawa et al., "Preparation of MgF2 Sintered Body by Normal Sintering Combined with Capsule-Free Hot-Isostatic Pressing Treatment," Journal of the Ceramic Society of Japan, vol. 107 [12] pp. 1137-1139, Dec. 1999.
Abstracts of meeting of Japan Society of Powder and Powder Metallurgy Autumn Meeting 1998, 3-59A Preparation of high-density MgF2 sintered compact and its characteristic evaluation, by Tamotsu Harada et al.
Infrared Physics & Technology, "The dependency of optical properties on density for hot pressed MgF2," vol. 51, No. 6, Oct. 2008, pp. 546-549.
Infrared Physics & Technology, "Hot-pressing of bimodally distributed magnesium fluoride powder," vol. 53, Nov. 2010, pp. 430-433.
In FY Heisei 24 (2012), Medical equipment development project of solving the problem type "Development of Accelerator Type Neutron Capture Therapy System Using New Material Target Technology for Recurrent Cancer Therapy," Report of Research Products (Summary Version) Heisei: Feb. 25, 2013, Consignor Ministry of Economic, Trade and Industry Cosignee CICS Co., Ltd.
International Search Report dated Aug. 26, 2014 in International (PCT) Application No. PCT/JP2014/064038.
Tanaka et al., "Experimental verification of beam characteristics for cyclotron-based epithermal neutron source (C-BENS)", Applied Radiation and Isotopes, vol. 69, Mar. 2011, pp. 1642-1645.
Imoto et al., "Evaluation for activities of component of Cyclotron-Based Epithermal Neutron Source (C-BENS) and the surface of concrete wall in irradiation room", Applied Radiation and Isotopes, vol. 69, Apr. 2011, pp. 1646-1648.
Kumada et al., "Dosimetry for Neutron Capture Therapy in JRR-4", Health Physics, vol. 42(1), 2007, pp. 23-37, with English translation.
Extended European Search Report dated Feb. 26, 2016 in corresponding European Application No. 14806519.6.
Kononov et al., "Accelerator-Based Source of Epithermal Neutrons for Neutron Capture Therapy", Atomic Energy, vol. 97, No. 3, 2004, pp. 626-631.
Third Party Observation of Apr. 20, 2016 in corresponding European Application No. 140806519.6.
"Development of accelerator-based neutron capture therapy system using the new material target technology for the recurrent cancer treatment" Cancer Intelligence Care Systems, Inc. (CICS), Feb. 2013, pp. 1-23 (with partial translation of pp. 11 and 19).
Shirakawa et al., "Preparation of $MgF_2$ Sintered Body by Normal Sintering Combined with Capsule-Free Hot-Isostatic Pressing Treatment", Journal of the Ceramic Society of Japan, vol. 107, No. 12, 1999, pp. 1137-1139.
Third Party Observation of Jul. 25, 2016 in corresponding European Application No. 140806519.6.
"Development of accelerator-based neutron capture therapy system using the new material target technology for the recurrent cancer treatment" Cancer Intelligence Care Systems, Inc. (CICS), Feb. 2013, pp. 1-23 (with full translation).
Part 1 of Third Party Observation of Aug. 5, 2016 in corresponding European Application No. 140806519.6.
"Development of accelerator-based neutron capture therapy system using the new material target technology for the recurrent cancer treatment" Cancer Intelligence Care Systems, Inc. (CICS), Feb. 2013, pp. 1-23 (with partial translation).
Moghim et al., "Hot-pressing of bimodally distributed magnesium fluoride powder", Infrared Physics & Technology, vol. 53, Aug. 5, 2010, pp. 430-433.
Nofar et al, "The dependency of optical properties on density for hot pressed $MgF_2$", Infrared Physics & Technology, vol. 51, Issue 6, Jul. 3, 2008, pp. 546-549.
Abstracts of meeting of Japan Society of Powder and Powder Metallurgy Autumn Meeting 1998, Period: Nov. 18 (Wed.) to Nov. 20 (Fri.), Venue: Building 8, Kanazawa Institute of Technology, 9 pages (with full translation).
Part 2 of Third Party Observation issued Aug. 5, 2016 in corresponding European Application No. 140806519.6 (with table of relevance of publications and publication brief details).
Shirakawa et al., "Preparation of $MgF_2$ Sintered Body by Normal Sintering Combined with Capsule-Free Hot-Isostatic Pressing Treatment", Journal of the Ceramic Society of Japan, vol. 107, No. 12, 1999, pp. 1137-1139 (with cover and table of contents).
Kim et al., "Current Research on Accelerator-Based Boron Neutron Capture Therapy in Korea", Nuclear Engineering and Technology, Special Issue in Celebration of the 40th Anniversary of the Korean Nuclear Society, vol. 41, No. 4, May 2009, pp. 531-544.
Kononov et al., "Optimization of an accelerator-based epithermal neutron source for neutron capture therapy", Applied Radiation and Isotope, vol. 61, 2004, pp. 1009-1013.

\* cited by examiner

Fig.5

[Table 1]

| MgF₂ | | Neutron Flux after Moderation ($n/cm^2/sec$) | | | Gamma Dose ($Gy/h$) | Mix Rate ($Gy \cdot cm^2$) | |
|---|---|---|---|---|---|---|---|
| Bulk Density ($g/cm^3$) | Relative Density (%) | Fast Neutrons | Epithermal Neutrons | Thermal Neutrons | | Fast Neutrons | Gamma-rays |
| 3.055 | 97 | 3.03 E+08 | 2.78 E+09 | 0.98 E+08 | 0.38 | 5.32E-13 | 3.83E-14 |
| 2.990 | 95 | 3.28 E+08 | 2.83 E+09 | 1.01 E+08 | 0.37 | 5.73E-13 | 3.65E-14 |
| 2.900 | 92 | 3.53 E+08 | 2.88 E+09 | 1.04 E+08 | 0.35 | 6.12E-13 | 3.49E-14 |
| 2.835 | 90 | 3.82 E+08 | 2.91 E+09 | 1.08 E+08 | 0.34 | 6.70E-13 | 3.35E-14 |

Fig.6
[Table 2]

| | Preliminary Sintering | | | Sintering [Fast Stage, Second Stage] | | Density of Sintered Body | | Neutron Flux after Moderation (n/cm²/sec) | | | Mechanical Strengths | | Evaluation |
|---|---|---|---|---|---|---|---|---|---|---|---|---|---|
| | Atmosphere | Heating Temperature×Holding Time (°C) (hr) | | Atmosphere | Heating Temperature × Holding Time (°C) (hr) | Bulk Density (g/cm³) | Relative Density (%) | Fast Neutrons | Epithermal Neutrons | Thermal Neutrons | Bending Strength (MPa) | Vickers Hardness | |
| Example 1 | Air | 600 × 5 | | $N_2$ gas | 830 × 6, 1000 × 2 | 3.05 | 96.8 | 3.08 E+08 | 2.79 E+09 | 0.99 E+08 | 20 | 110 | ◎ |
| Example 2 | do. | 550 × 10 | | do. | 750 × 9, 920 × 2 | 2.90 | 92.1 | 3.53 E+08 | 2.89 E+09 | 1.03 E+08 | 12 | 74 | ○ |
| Example 3 | do. | 600 × 8 | | do. | 840 × 12, 1080 × 1 | 3.00 | 95.2 | 3.20 E+08 | 2.82 E+09 | 1.01 E+08 | 18 | 100 | ○ |
| Example 4 | do. | 600 × 10 | | do. | 830 × 12, 1080 × 1 | 3.07 | 97.5 | 2.93 E+08 | 2.77 E+09 | 0.98 E+08 | 25 | 120 | ◎ |
| Example 5 | do. | 580 × 10 | | do. | 800 × 12, 920 × 3 | 3.02 | 95.9 | 3.15 E+08 | 2.81 E+09 | 0.995E+08 | 18 | 100 | ◎ |
| Example 6 | do. | 580 × 7 | | do. | 830 × 12, 1000 × 3 | 2.99 | 94.9 | 3.27 E+08 | 2.83 E+09 | 1.01 E+08 | 16 | 90 | ○ |
| Example 7 | do. | 580 × 10 | | do. | 840 × 8, 980 × 3 | 2.96 | 94.0 | 3.38 E+08 | 2.85 E+09 | 1.02 E+08 | 14 | 85 | ○ |
| Example 8 | do. | 560 × 8 | | do. | 840 × 5, 920 × 3 | 2.91 | 92.4 | 3.47 E+08 | 2.88 E+09 | 1.03 E+08 | 12 | 75 | ○ |
| Example 9 | do. | 580 × 10 | | He gas | 840 × 8, 980 × 3 | 3.00 | 95.2 | 3.22 E+08 | 2.82 E+09 | 1.01 E+08 | 16 | 90 | ◎ |
| Example 10 | do. | 560 × 6 | | $N_2$ gas | 770 × 10, 900 × 3 | 2.90 | 92.1 | 3.50 E+08 | 2.90 E+09 | 1.03 E+08 | 11 | 71 | ○ |
| Example 11 | do. | 550 × 8 | | do. | 790 × 6, 940 × 1.5 | 2.91 | 92.4 | 3.47 E+08 | 2.93 E+09 | 1.03 E+08 | 12 | 73 | ○ |
| Comparative Example 1 | Air | 530 × 5 | | do. | 750 × 9, 920 × 2 | 2.88 | 91.4 | 3.59 E+08 | 2.91 E+09 | 1.035 E+08 | 10 | 70 | △ |
| Comparative Example 2 | do. | 530 × 5 | | do. | 740 × 4, 890 × 2 | 2.80 | 88.9 | 3.95 E+08 | 2.94 E+09 | 1.055 E+08 | — | — | × |
| Comparative Example 3 | do. | 550 × 10 | | do. | 750 × 9, 880 × 1.5 | 2.88 | 91.4 | 3.57 E+08 | 2.91 E+09 | 1.04 E+08 | 10 | 70 | △ |
| Comparative Example 4 | do. | 600 × 10 | | do. | 840 × 8, 1150 × 3 | 2.87 | 91.1 | 3.62 E+08 | 2.92 E+09 | 1.04 E+08 | 10 | 70 | △ |
| Comparative Example 5 | do. | 550 × 5 | | do. | 740 × 6, 900 × 1 | 2.86 | 90.8 | 3.70 E+08 | 2.93 E+09 | 1.04 E+08 | 9 | 65 | △ |
| Comparative Example 6 | do. | 500 × 4 | | do. | 730 × 5, 900 × 1 | 2.85 | 90.8 | 3.74 E+08 | 2.93 E+09 | 1.05 E+08 | 8 | 60 | △ |
| Comparative Example 7 | do. | 550 × 5 | | He gas | 740 × 6, 900 × 1 | 2.89 | 91.7 | 3.52 E+08 | 2.89 E+09 | 1.03 E+08 | 10 | 70 | △ |
| Comparative Material ($CaF_2$) | Air | 600 × 6 | | $N_2$ gas | 870 × 6, 1100 × 1 | 3.05 | 95.9 | 11.30E+08 | 3.20 E+09 | 1.10 E+08 | 40 | 240 | × |

— : unmeasurable, ◎: Excellent, ○: Good, △: Problem, ×: Great Problem

FLUORIDE SINTERED BODY FOR NEUTRON MODERATOR AND METHOD FOR PRODUCING THE SAME

TECHNICAL FIELD

The present invention relates to a fluoride sintered body and a method for producing the same, and more particularly, to a fluoride sintered body for a neutron moderator having a compact structure suitable for a moderator to restrict the radiation velocity of radioactive rays of every kind such as neutrons and a method for producing the same.

BACKGROUND ART

Among fluorides, a calcium fluoride ($CaF_2$) single crystal body, a magnesium fluoride ($MgF_2$) single crystal body and the like have been relatively widely used in the optical field. There are very few cases where a fluoride is used in other than the optical field. The $CaF_2$ single crystal body, having the advantage of a high plasma resistance, has been rarely used in a semiconductor manufacturing process. An application thereof to a member which is required to have the highest plasma resistance within a plasma etching furnace of silicon wafers, such as a ring boat or a ceiling board, has been considered. However, the $CaF_2$ single crystal body is extremely expensive, and there has been no report that it was used in the actual manufacturing line.

The $CaF_2$ single crystal body, and a lithium fluoride (LiF) or an aluminum fluoride ($AlF_3$) single crystal body have been rarely used as a shield to neutrons, one of radioactive rays.

Large quantities of radioactive rays exist in the space, but most of them are cut off due to the earth's magnetic field and the influence of the atmosphere, resulting in the presence of just a trace quantity of them on the earth. Artificially, for example, radioactive rays such as neutrons are generated by nuclear reaction within a nuclear reactor.

The radioactive rays are classified into alpha ($\alpha$)-rays, beta ($\beta$)-rays, gamma ($\gamma$)-rays. X-rays, neutrons and the like. The power passing through a substance (penetrability) gradually increases in this order.

The neutrons which are said to have the highest penetrability among the radioactive rays are further classified into small groups according to energy level. One example thereof is shown below. The energy level each type of neutrons has is shown in parentheses, and the larger the value is, the higher the penetrability is.

In the order of the lowest penetrability, they are classified into cold neutrons (up to 0.002 eV), thermal neutrons (up to 0.025 eV), epithermal neutrons (up to 1 eV), slow neutrons (0.03-100 eV), immediate neutrons (0.1-500 keV) and fast neutrons (500 keV or more). Here, the energy values in the parentheses are not precise, and there are various views concerning the classification of neutrons. For example, there is a view which mentions 40 KeV or less, which is within the above energy region of intermediate neutrons, as the energy of epithermal neutrons.

The typical effective utilization of neutrons is an application to the medical care field. The radiation therapy in which malignant tumor cells are irradiated with neutrons so as to be broken has been rapidly coming into general use in recent years. In order to obtain sufficient medical effects in the present radiation therapy, neutrons of a certain high energy must be used. In irradiation with high-energy neutrons, the influence on a part (a healthy part) other than an affected part of a patient cannot be avoided, leading to side effects. Therefore, in the present situation, the application of the radiation therapy is limited to severe patients.

When a normal cell is exposed to high-energy radiation, its DNA is damaged, leading to side effects such as dermatitis, anemia due to radiation and leukopenia. Furthermore, in some cases, a late injury may be caused some time after treatment, and a tumor may be formed and bleed in the rectum or the urinary bladder.

In order not to cause such side effects and late injuries, methods of pinpoint irradiation on a tumor have been studied. Examples thereof are: 'Intensity Modulated Radiation Therapy (IMRT)' in which only a tumor portion is three-dimensionally irradiated accurately with a high radiation dose; 'Motion Tracking Radiation Therapy' in which radiation is emitted to motions in the body of a patient such as breathing or heartbeat; and 'Particle Beam Radiation Therapy' in which a baryon beam or a proton beam each having a high remedial value is intensively emitted.

The half-life of a neutron which is often used in such radiation therapies is short. 887.0±2.0 sec (about 15 min). The neutron decays in a short period of time, releases electrons and neutrinos, and turns into protons. The neutron has no charge, and therefore, it is easily absorbed when it collides with a nucleus. The absorption of neutrons in such a manner is called neutron capture, and one example of an application of neutrons to the medical care field by use of this feature is 'Boron Neutron Capture Therapy (hereinafter, referred to as BNCT)', which is recently gaining attention.

In this method, by causing malignant tumor cells of a patient to react with boron, a reaction product (a boron compound) is formed in the tumor portion, and the reaction product is then irradiated with neutrons (comprising mainly epithermal neutrons and thermal neutrons) which have less influences on a healthy portion. And a nuclear reaction is caused only within the very small range where the boron compound has been formed, resulting in making only the tumor cells extinct.

This method was proposed about 60 years ago. Because of small influences on a healthy portion of a patient, it has been attracting attention as an excellent radiation therapy since quite long before and has been studied in varied countries. However, there are wide-ranging problems on the development such as a neutron generator, a device for a choice and selection of neutrons to be remedially effective (a moderation system device), and avoidance of influences on a healthy portion of a patient (one of the requirements is to form a boron compound only in a tumor portion).

At the present time, many of these problems cannot be said to have been sufficiently solved, and the method has not come into wide use as a general therapy. One of significant factors why it has not come into wide use is that in most of the past cases, a neutron generator was attached to an existing nuclear reactor and that all of the studies, developments and medical practices were conducted at the site, that is, the situation suitable for medical use could not be realized. In order to radically improve such situation, a neutron generator for medical use only must be developed and be put to practical use, and in Japan, a few device manufacturers are promoting the development of a neutron generator of this kind, in order to meet the expectations.

In addition to the development of a small-sized high-performance neutron generator, another significant factor why it has not come into wide use is that a moderation system device must be also made high-performance and downsized. This is another major problem in aiming at practical use of the method.

In order to effectively utilize neutrons as a particle beam for medical treatment, the selection of neutron types is important, and one example is shown below.

From the point of view of medical effects, by removing high-energy neutrons which adversely influence healthy bodily tissues and reducing extremely-low-energy neutrons having little medical effect (such as thermal neutrons and cold neutrons), leading to a higher ratio of neutrons having high medical effects (such as a low-energy part of intermediate neutrons and epithermal neutrons), a desirable particle beam for medical treatment can be formed.

The epithermal neutrons and the low-energy part of intermediate neutrons have a high invasive depth to the internal tissues of a patient. Therefore, for example, without craniotomy required in the case of brain tumor, or without an abdominal operation required even if the abdominal operation on another important internal organ cannot be easily performed, it is possible to carry out effective irradiation on an affected part.

On the other hand, when the extremely-low-energy neutrons such as thermal neutrons are used, because of their low invasive depth, craniotomy or an abdominal operation is required, resulting in a significant burden on the patient.

In order to safely and effectively utilize radiation, it is necessary to suitably select and arrange moderators. In order to effectively use neutrons having the highest penetrability among radioactive rays, it is important to know the moderation performance of materials of every kind to neutrons, leading to effective moderation.

Most of neutrons generated by an accelerator such as a cyclotron are high-energy neutrons, and by using a moderator, high-energy neutrons whose energy level adversely influences a body (such as fast neutrons and a high-energy part of intermediate neutrons) should be removed as many as possible.

In order to secure a required dose of the above-mentioned neutrons having high medical effects as well as cut off the high-energy neutrons which adversely influence the body to non-existent, highly difficult moderation control is required. Generally, when trying to secure a required dose of neutrons having high medical effects, high-energy neutrons are inevitably included. Therefore, the high-energy neutrons need be removed as many as possible in the next moderation step.

There is one system of the above-mentioned Boron Neutron Capture Therapy (BNCT), which a group with Kyoto University as the central figure has been recently promoting (Non-Patent Document 1 and Non-Patent Document 2). In this system, without being attached to an existing nuclear reactor, a cyclotron accelerator as a neutron generator is exclusively installed. The neutron generator for medical use only is adopted.

However, the cyclotron accelerator is large due to insufficient downsizing. And as a moderator selected for a radiation shield in order to safely and effectively utilize radiation (mainly neutrons) generated by this cyclotron accelerator, polyethylene containing calcium fluoride ($CaF_2$) and lithium fluoride (LiF) is used, as well as lead (Pb), iron (Fe), aluminum (Al) and polyethylene.

It cannot be said that the moderation performance of these moderators is sufficient. Though the details are described below, on condition that a required dose of epithermal neutrons most suitable for treatment by BNCT should be obtained, the neutrons obtained after moderation with the combination of these moderators are mixed with a large quantity of last neutrons having an adverse influence on healthy tissues.

In order to conduct required moderation, the moderator becomes quite thick. In other words, the moderation system device becomes large. Therefore, there is a problem that the whole apparatus cannot be sufficiently downsized. In order to allow this BNCT to come into wide use in general hospitals, downsizing of the whole apparatus is a necessary condition. In order to downsize both of the accelerator and the moderation system device, the development of a moderator excellent in moderation performance is an urgent necessity.

The selection of a moderator which is important for improving remedial values and downsizing a BNCT apparatus is described below in detail.

In the BNCT, it is required to remove high-energy neutrons such as fast neutrons and to irradiate an affected part with neutrons comprising mainly epithermal neutrons and a small quantity of thermal neutrons.

Specifically, an estimated dose of epithermal neutrons and thermal neutrons required in cases where the irradiation time is in the order of one hour, is said to be about $1\times10^9$ [$n/cm^2/sec$]. In order to secure the dose, it is said that as the energy of an outgoing beam from an accelerator being a source of neutrons, about 5 MeV-10 MeV is required when beryllium (Be) is used as a target for the formation of neutrons.

The selection of particle beam types through moderators of every kind in a neutron radiation field for BNCT using an accelerator is described below.

A beam emitted from the accelerator collides with a target (Be), and by nuclear reaction, high-energy neutrons, mainly fast neutrons and the like are generated. As a method for moderating the fast neutrons, using Pb and Fe each having a large inelastic scattering cross section, the neutrons are moderated while suppressing the attenuation thereof. They are moderated to some extent (up to the order of 1 MeV) using these two kinds of moderators, and then moderated/optimized according to the neutron energy required in the radiation field.

As a moderator to the neutrons moderated to some extent, aluminum oxide ($Al_2O_3$), aluminum fluoride ($AlF_3$), $CaF_2$, graphite, heavy water ($D_2O$) or the like is used. By injecting the neutrons moderated nearly to 1 MeV into these moderators, it is required to moderate them to the epithermal neutron energy region (4 keV-40 keV) suitable for BNCT.

In the case of the above group with Kyoto University as the central figure, as moderators, Pb, Fe, Al, $CaF_2$, polyethylene and polyethylene containing LiF are used.

The polyethylene and polyethylene containing LiF among them are moderators for shielding arranged in a manner that cover the outside portion of the apparatus in order to prevent leakage of high-energy neutrons out of the radiation field.

To moderate the high-energy neutrons to some extent using Pb and Fe among these moderators (the first half of a moderation stage) is desirable, but it cannot be said that the second half of the moderation stage using Al and $CaF_2$ after the moderation to some extent is very desirable. In this type of neutrons moderated to some extent, a quite large quantity of high-energy neutrons harmful to healthy cells is left. It is required to remove these high-energy neutrons to non-existent while allowing a required dose of intermediate-energy-level neutrons such as epithermal neutrons having high medical effects to remain, but it cannot be said that this point has been sufficiently achieved.

That is, in the case of the moderators (Al and $CaF_2$) used in the second half of the stage, many of the high-energy neutrons left through the moderation in the first half of the stage pass through them without cutoff. If such neutrons are used in a therapy as they are, a bad influence on healthy tissues of a patient cannot be avoided.

That is because $CaF_2$ in the moderators used in the second half of the stage does not have sufficient cutoff performance to the high-energy neutrons, and part of them passes without cutoff.

The polyethylene containing LiF as well as $CaF_2$ used in the second half of the stage is used in a manner that covers over the entire surface except an outlet of neutrons on the treatment room side. It is arranged so as to prevent whole-body exposure of a patient to the fast neutrons, and is not used as a moderator on the outlet.

The polyethylene as a moderator in the first half of the stage is used in a manner that covers over the entire surface of the periphery of the apparatus except the treatment room side, like the polyethylene containing LiF in the second half of the stage, and it is arranged so as to prevent the fast neutrons from leaking to the surroundings of the apparatus.

Therefore, instead of $CaF_2$ in the second half of the stage, the development of an excellent moderator which can cut off and moderate high-energy neutrons while suppressing the attenuation of intermediate-energy-level neutrons required for treatment has been desired.

From various kinds of researches/studies, the present inventors paid attention to $MgF_2$ system sintered bodies as a moderator for obtaining neutrons having an energy distribution optimal to treatment (4 keV-40 keV), mainly comprising epithermal neutrons in anticipation of the highest remedial value, from the above neutrons moderated to some extent (up to 1 MeV).

The $MgF_2$ system sintered bodies include a $MgF_2$ sintered body as well as a $MgF_2$—$CaF_2$ binary system sintered body, a $MgF_2$—LiF binary system sintered body, a $MgF_2$—$CaF_2$—LiF ternary system sintered body, and the like. Until now, there is no report that $MgF_2$ was used as a moderator to neutrons. There is no report of an example in which $MgF_2$ system sintered bodies, including a $MgF_2$ sintered body and a $MgF_2$—$CaF_2$ binary system sintered body, were adopted as neutron moderators.

In the present application, an invention concerning a sintered body of $MgF_2$ simple (equivalent to single) (hereinafter, referred to as a $MgF_2$ sintered body) is described below.

$MgF_2$ is a colorless crystal, having a melting point of 1248° C., a boiling point of 2260° C. a density of 3.15 g/cm³, a cubic system and a rutile structure according to a science and chemistry dictionary. A single crystal body thereof has a high transparency, and since a high light transmittance is obtained within a wide range of wavelength of about 0.2 µm-7 µm and it has a wide band gap and a high laser resistance, it has been mainly used as a window material for eximer laser. Or $MgF_2$ is deposited on the surface of a lens to be used for protection of the inner parts thereof or prevention of irregular reflection, both of them for optical use.

Though in either case, a $MgF_2$ single crystal body is used for optical use, the single crystal body is extremely expensive since the single crystal growth thereof takes long time and control of the crystal growth is highly difficult. Therefore, the use thereof is limited from the point of view of economical efficiency.

On the other hand, since the $MgF_2$ sintered body has a poor light transmittance and a low transparency because of its polycrystalline structure, it is not suitable for optical use.

There are very few cases where $MgF_2$ in the form of a single crystal body as well as a sintered body was used for other than optical use. There are just a few cases where a sintered body thereof was used for a plasma-resistant member, which are described below.

As one example of an application of a sintered body mainly containing $MgF_2$ to a plasma-resistant member, Japanese Patent Application Laid-Open Publication No. 2000-86344 (the below-mentioned Patent Document 1) is cited. In the scope of claims concerned, a sintered body comprises a fluoride of at least one kind of alkaline earth metals selected from the group of Mg, Ca, Sr and Ba, in which the total amount of metallic elements other than the alkaline earth metals is 100 ppm or less on a metal basis, a mean diameter of crystal grains of the fluoride is 30 µm or less, and the relative density is 95% or more.

However, the substances in the list of examples of this publication were obtained by firing a metal fluoride of each single kind of the above four alkaline earth metals (i.e. $MgF_2$, $CaF_2$, $SrF_2$ and $BaF_2$) as a raw material, and there is no description that a mixture of those raw materials was fired.

In firing of $MgF_2$ and $CaF_2$ as raw materials according to the examples shown in Table 1, the firing temperatures in the cases evaluated as appropriate (shown with ⊚ or ○ in the Table) are 850° C., 950° C. and 1050° C. with $MgF_2$, and any relative density of the sintered bodies is 95% or more. Likewise, with $CaF_2$, the appropriate firing temperatures are 950° C., 1040° C. and 1130° C., and any relative density of the sintered bodies is 97% or more.

On this point, according to the studies/experiments by the present inventors, $MgF_2$ and $CaF_2$ each presented a sublimation phenomenon at temperatures equal to these firing temperatures or lower than these, and a violent foaming phenomenon occurred at the above firing temperatures. Therefore, it was found that it was impossible to obtain a sintered body of $MgF_2$ with a relative density of 95% or more, and a sintered body of $CaF_2$ with a relative density of 97% or more.

The present inventors ascertained prior to such firing experiments through differential thermal analysis of raw material powders that the sublimation of $MgF_2$ starts at about 800° C. and becomes brisk at 850° C. or more, and that the sublimation of $CaF_2$ starts at about 850° C. and becomes brisk at 900° C. or more.

The results of this differential thermal analysis show that all of the firing temperatures in three cases of $MgF_2$ and $CaF_2$ each indicated as 'appropriate' in the examples of the Patent Document 1 are temperature conditions wherein a sublimation phenomenon briskly occurs in the firing process, and that it is actually difficult to make the sintered bodies compact.

The inventors of this Patent Document 1 indicate in the description "since $AlF_3$ starts to sublimate at a relatively low temperature, resulting in a necessity of firing while suppressing sublimation, it was difficult to obtain a compact sintered body". They appear to have known 'a sublimation phenomenon revealed in firing', that is, 'foaming of a sintered body', that is. 'it is difficult to obtain a compact sintered body'.

However, for reasons unclear, as mentioned above, in either case of $MgF_2$ and $CaF_2$, it is described that the sintered bodies were produced at firing temperatures higher than the above temperatures at which the sublimation phenomenon starts. This means that sintering was conducted under the conditions difficult to obtain a compact sintered body due to the occurrence of brisk foaming within the sintered body in the firing process to promote sintering of a raw material powder.

The present inventors grabbed such phenomenon and studied a method for minimizing the influence of the sublimation phenomenon in the sintering process, and developed an excellent sintering method by which compact sintered bodies can be stably obtained.

Another example of an application of a sintered body mainly containing $MgF_2$ to a plasma-resistant member is the Japanese Patent Application Laid-Open Publication No. 2012-206913 (the below-mentioned Patent Document 2). This invention discloses a method wherein, since a sintered body of $MgF_2$ simple has a defect of low mechanical strength, by mixing at least one kind of non-alkaline metallic substance having a lower mean linear thermal expansion coefficient than $MgF_2$ such as $Al_2O_3$, AlN, SiC or MgO, the defect of low mechanical strength of a $MgF_2$ simple sintered body is compensated for. When a sintered body of such mixture is used as the above moderator to neutrons, the moderation performance thereof is greatly different from that of $MgF_2$ simple because of the influence of the non-alkaline metal mixed with $MgF_2$. Therefore, it was predicted that it was difficult to apply a sintered body of this kind of mixture to use as a moderator.

As an invention related to a $MgF_2$ sintered body, the Japanese Patent Application Laid-Open Publication No. 2000-302553 (the below-mentioned Patent Document 3) is cited. The greatest defect of sintered bodies of fluoride ceramics such as $MgF_2$, $CaF_-$, $YF_3$ and LiF is low mechanical strength, and in order to solve this problem, invented was a sintered body made by compounding these fluorides and $Al_2O_3$ at a predetermined ratio. However, as the corrosion resistance and mechanical strength of the sintered body produced by this method, in any combination, a sintered body having just an intermediate characteristic between both of the characteristics of those fluorides and $Al_2O_3$ was obtained. A sintered body having a characteristic exceeding both of the characteristics was not obtained by compounding.

As described above, in order to use a sintered body obtained by firing a mixture of $MgF_2$ sintered by a conventional method with other substances for use other than plasma-resistant members, specifically, for new use such as a moderator to neutrons, one of radiation, there were a lot of problems left to be solved.

PRIOR ART DOCUMENT

Patent Document

Patent Document 1: Japanese Patent Application Laid-Open Publication No. 2000-86344
Patent Document 2: Japanese Patent Application Laid-Open Publication No. 2012-206913
Patent Document 3: Japanese Patent Application Laid-Open Publication No. 2000-302553

Non-Patent Document

Non-Patent Document 1: H. Tanaka et al., Applied Radiation and Isotopes 69 (2011) 1642-1645
Non-Patent Document 2: H. Tanaka et al., Applied Radiation and Isotopes 69 (2011) 1646-1648 Non-Patent Document 3: Hiroaki Kumada et al., Health Physics, 42 (2007) 23-37

SUMMARY OF THE INVENTION

Means for Solving Problem and the Effect

The present invention was developed in order to solve the above problems, and it is an object of the present invention to provide a fluoride sintered body for a neutron moderator, which is used in order to moderate the energy of neutrons in the good use of the neutrons, a kind of radiation, and is inexpensive unlike a high-purity single crystal body, and with which effective moderation effects can be obtained, resulting in capability of enhancing remedial values while downsizing an apparatus for therapy, and a method for producing the same.

The present inventors first gave basic consideration to the selection of substances (metals or compounds) having a sufficient moderation effect on high-energy neutrons.

In the BNCT, as described above, it is important to irradiate an affected part with neutrons comprising mainly epithermal neutrons and a trace quantity of thermal neutrons in order to minimize high-energy neutrons which are harmful in therapy while obtaining a large remedial value. Specifically, an estimated dose of epithermal neutrons and thermal neutrons required in the case of the order of one hour of irradiation time is about $1 \times 10^9$ [n/cm$^2$/sec]. It is said that the energy of an outgoing beam from an accelerator being a source of neutrons required for that is about 5 MeV-10 MeV when beryllium (Be) is used as a target for the formation of neutrons.

The selection of particle beam types by moderators of every kind in a neutron radiation field for BNCT using an accelerator is described below.

A beam emitted from the accelerator collides with a target (Be), and by nuclear reaction, mainly high-energy neutrons (fast neutrons) are generated. As a method for moderating the fast neutrons, using Pb, Fe or the like having a large inelastic scattering cross section, the neutrons are moderated to some extent while suppressing the attenuation thereof. The moderator to the neutrons moderated to some extent (up to 1 MeV) is optimized according to the quantity of neutron energy required in the radiation field.

As a moderator to the neutrons moderated to some extent, generally, aluminum oxide ($Al_2O_3$), aluminum fluoride ($AlF_3$), $CaF_2$, graphite, heavy water ($D_2O$) or the like is used. By injecting the neutrons moderated nearly to 1 MeV into these moderators, the neutrons are moderated to the range of epithermal neutrons having energy (4 keV-40 keV) suitable for BNCT. However, by the method using the above moderators, the removal of fast neutrons which adversely influence healthy tissues of a patient in therapy tends to be insufficient. Then, if priority is given to this removal of fast neutrons, the neutrons are contrarily moderated too much and further moderated below the range of epithermal neutrons, and the ratio of thermal neutrons having a smaller remedial value than epithermal neutrons becomes large.

Therefore, the present inventors selected two kinds of fluorides, $MgF_2$ and $CaF_2$, as candidates of hopeful moderators to the neutrons moderated to some extent from among compounds of every kind, and examined the below-described moderation effects. As a result (FIG. 4), it was ascertained that by injecting the neutrons moderated nearly to 1 MeV into a moderator made of $MgF_2$, fast neutrons harmful in BNCT could be almost perfectly removed, and that epithermal neutrons in the energy range (4 keV-40 keV) optimal to the therapy could be obtained.

There were various kinds of problems in producing a moderator made of $MgF_2$, and what should have been thought first of all was a method for producing it. As a method for producing it, a crystal method, a single crystal method, a polycrystal method (i.e. a sintering method) and the like may be exemplified.

A crystal produced by a crystal method generally has segregation in crystal orientation and impurities also easily result in segregation. When it is used as a moderator, variation easily arises in moderation performance depending on the part. Therefore, it appears to be unsuitable for a moderator.

A single crystal produced by a single crystal method requires a high control accuracy in production, the stability of its quality is poor, and the cost thereof is extremely high. Therefore, it must be said that it is unsuitable for a moderator.

Then, this time, the present invention was completed by studying and developing a method for producing a moderator through a polycrystal method (hereinafter, referred to as a sintering method).

Basic Technical Ideas of the Present Invention (1) Securing the purity of products in order to secure the performance as a moderator In order to secure the performance as a $MgF_2$ moderator, first of all, securing the purity of products is important. In order to secure the purity thereof, it was thought that securing the purity on the raw material level, and keeping impurities from getting mixed in the manufacturing process were important, and taking these into consideration, the moderation performance was secured.

There are three purity levels of $MgF_2$ raw materials on the market such as 2N (99.0%), 3N (99.9%) and 4N (99.99%), and in a preliminary small-scale test, using these three purity levels of raw materials, the states of sintering characteristics were evaluated.

(2) Relaxing sintering conditions by pulverizing the raw materials

By pulverizing the raw material grains, reaction interfaces between grains in the sintering process were increased, so as to promote the progress of defoaming and make the progress of sintering reaction of every sintering part uniform.

(3) Making the sintering reaction uniform by dividing the sintering step

The sintering step was divided into preliminary sintering and main sintering (when the main sintering is further divided, the effects tend to increase). In the preliminary sintering step, the sintering reaction was mainly caused by grain growth by solid phase reaction (hereinafter, referred to as solid-phase sintering), while in the main sintering step, the sintering reaction was caused in the solid solution formation temperature region mainly by sintering body formation through solid solution formation reaction (hereinafter, referred to as solid solution sintering), or by sintering body formation through melt formation reaction (hereinafter, referred to as melting sintering). As a result, combined with the effect of pulverizing the raw materials in the above paragraph (2), the progress of the sintering reaction of every sintering part could be made uniform, and the sintered body could be allowed to have strong cohesion between particles.

In addition to the moderation performance, the moderator needs to have a resistance to damage occurrence in handling such as the installation thereof in a moderation system device and a resistance to dust generation caused by neutron irradiation impacts. That is, it is required to have a characteristic excellent in mechanical strength. The mechanical strength of a sintered body is determined by micro strength of bonding parts between particles and the defoaming state such as the size, shape, distribution and number of bubbles, in other words, the shape such as the width and length of the bonding parts and a bound body (parent) of ex-particles (the compactness of the sintered body), and moreover, the brittleness originated from a crystal structure (such as single crystal or polycrystal) of the parent.

(4) $MgF_2$, a raw material for forming a high-density sintered body by foaming restriction and reduction of large-sized residual bubbles in the sintering process, easily causes a vaporization (sublimation) phenomenon in the sintering process, generates fluorine gas and easily causes a large number of fine bubbles within the sintered body. This foaming by vaporization and the decrease of voids essentially with the progress of the sintering process are contrary to each other. Therefore, it was decided to minimize the foaming.

When a fluoride system raw material is heated at a high temperature, part of the material vaporizes. The temperature of the starting of vaporization depends on the composition. In the case of a composition chiefly comprising $MgF_2$, vaporization starts at about 800° C. and becomes very brisk at about 850° C. Since the vaporization causes fluorine gas, fine bubbles are formed in the sintered body. The shapes of the formed bubbles are almost spherical, and when observing the broken-out section of the sintered body with an electron microscope (SEM), the sections of the bubbles look circular close to a perfect circle. The sizes of the bubbles are in the order between several μm of smaller ones and 20 μm-40 μm of larger ones described in diameter seen in the broken-out section. The shapes of the smaller bubbles of several μm in diameter are almost circular, while the shapes of the larger ones are rarely circular. Most of them are long and narrow, or angular, or irregular. From these shapes, it is considered that the smaller bubbles are freshly formed, and that the larger ones are aggregates of some of the formed bubbles.

Therefore, it was decided to avoid the formation of small bubbles (foaming) as much as possible by means of sintering by heating at a low temperature, and also to avoid gathering of small bubbles through the process of heating as much as possible so as to make the sintered body compact. Combining the ideas of the above paragraphs (1)-(3), it was decided to produce a fluoride sintered body for a neutron moderator having a characteristic excellent in mechanical strength which is a required characteristic other than moderation performance as a member of a neutron moderation system device.

In order to achieve the above object, a fluoride sintered body for a neutron moderator according to a first aspect of the present invention is characterized by comprising $MgF_2$ of a compact polycrystalline structure, having a bulk density of 2.90 g/cm$^3$ or more.

Since the fluoride sintered body for a neutron moderator according to the first aspect of the present invention is a sintered body of $MgF_2$ of a compact polycrystalline structure having a bulk density of 2.90 g/cm$^3$ or more, the organizational structure of the sintered body is uniform, the difference between the internal and external parts is small, and by restricting the generated quantity of solid solution, the crystal growth is suppressed, leading to reducing the formation of brittle portions, resulting in enhancing the strength of the sintered body. Therefore, in the processing steps in producing the sintered body, or in handling between the steps, cracks or chips are not easily caused. A sintered body having a mechanical strength with which no damage such as cracks or chips may be caused when it is set in a BNCT apparatus, or even when neutron irradiation impacts are given thereto during operation of the apparatus, can be obtained. As a result, a fluoride sintered body for a neutron moderator having a good moderation performance and mechanical strength leading to easy handling can be provided.

The fluoride sintered body for a neutron moderator according to a second aspect of the present invention is characterized by having a bending strength of 10 MPa or more and a Vickers hardness of 71 or more as regards mechanical strengths in the fluoride sintered body for a neutron moderator according to the first aspect of the present invention.

The fluoride sintered body for a neutron moderator according to the second aspect of the present invention has extremely excellent mechanical strengths. Therefore, no crack or the like is caused in mechanical processing for finishing it as a moderator, and it can be a moderator having a sufficient impact resistance to neutron irradiation impacts given during use as a moderator.

In order to achieve the above object, a method fir producing a fluoride sintered body for a neutron moderator according to a first aspect of the present invention is characterized by comprising the steps of: pulverizing a high-purity $MgF_2$ raw material to the order of 1 µm-2 µm in median diameter and adding 0.1-1% by weight of a sintering aid thereto to mix; molding said mixed raw material as a starting raw material using a uniaxial press molding device at a molding pressure of 5 MPa or more; molding said uniaxially molded article using a cold isostatic pressing (CIP) device at a molding pressure of 5 MPa or more; conducting preliminary sintering by heating said CIP molded article to 550° C.-600° C. in an air atmosphere; and conducting main sintering by heating the same in the temperature range just below the starting temperature of foaming for 4-16 hours in an inert gas atmosphere to allow the sintering to make progress more uniformly, and then heating the same in the vicinity of the temperature limits in which a solid solution starts to be formed for 0.5-3 hours so as to form a $MgF_2$ sintered body having a compact structure.

Here, the CIP is a method for pressure molding wherein a uniaxially molded article is put into a bag sealed with a vinyl bag or the like in order not to directly touch clean water. The bag after deairing, is put within a pressure vessel, and the vessel is filled with clean water to apply a prescribed hydraulic pressure.

Here, the starting temperature of foaming is a temperature at which part of a fluoride compound starts to decompose and fluorine gas is generated so as to start to form fine bubbles. A preliminary sintered body formed by heating a $MgF_2$ raw material at 550° C. for 6 hours in an air atmosphere was grinded, and using the grinded substance as a sample of a differential thermal analyzer, alterations in weight and in endothermic and exothermic amount of the sample were examined while heating. A minute quantity of weight decrease was found at approximately 800° C. but it appeared that this was because, for example, fluorine attached to a parent of the preliminary sintered body or boron fluorine resolving in the parent, with a weak bonding property, dissociated and decomposed first of all. After further heating, a point of inflection of the weight decrease curve appeared at approximately 850° C., and the weight decrease became noticeable. It was anticipated that in the temperature limits above that, part of bonded boron fluorine in $MgF_2$ would start to decompose, which would cause the generation of fluorine gas and the formation of fine bubbles. Therefore, the temperature corresponding to this point of inflection, that is, about 850° C. is referred to as the starting temperature of foaming.

Here, the temperature range just below the starting temperature of foaming is specifically a temperature range of 750° C.-840° C.

Here, the temperature limits in which a solid solution starts to be formed are temperature limits in the vicinity of 980° C. in which a solid solution starts to be formed in a phase diagram of the $MgF_2$—$CaF_2$ binary system shown in FIG. 1.

The sintered body produced by the method for producing a fluoride sintered body for a neutron moderator according to the first aspect of the present invention has a strong bonding power between particles, leading to a high mechanical strength (micro strength) of the bonding parts. The bending strength and impact resistance which were problems to be solved are remarkably improved, and a sintered body which can be used as a neutron moderator without problems for actual use can be obtained. A sintered body to be produced has a higher degree of compactness according to the selection of the purity of $MgF_2$, heating atmosphere, heating temperature pattern and the like. Since the body is sintered, the crystalline structure thereof is polycrystalline, resulting in remarkable improvement of the brittleness compared with a single crystal.

Therefore, since the sintered body produced by the method for producing a fluoride sintered body for a neutron moderator according to the first aspect of the present invention has sufficient mechanical strengths in processing such as cutting-off, grinding and polishing as a moderator in a moderation system device for BNCT, and further in handling such as the installation thereof in the moderation system device, it can be installed without problems. Even if it is irradiated with neutrons, it can be used without problems to irradiation impacts thereof: and the moderation performance to neutrons is also extremely excellent.

The method for producing a fluoride sintered body for a neutron moderator according to a second aspect of the present invention is characterized by the inert gas atmosphere in the main sintering step comprising one kind of gas or a mixture of plural kinds of gases, selected from among nitrogen, helium, argon and neon, in the method for producing a fluoride sintered body for a neutron moderator according to the first aspect of the present invention.

Thus, as the inert gas, nitrogen ($N_2$), helium (He), argon (Ar) or neon (Ne) may be used.

BRIEF DESCRIPTION OF DRAWINGS

FIG. 5 is a table showing the relative densities of $MgF_2$ sintered bodies and alterations of the neutron type after moderation; and FIG. 6 is a table showing measured data of examples and comparative examples.

MODE FOR CARRYING OUT THE INVENTION

The preferred embodiments of the fluoride sintered body for a neutron moderator and the method for producing the same according to the present invention are described below by reference to the Figures.

In order to produce a fluoride sintered body suitable for a neutron moderator according to the preferred embodiments, a high-purity (purity of 99.9% by weight or more) $MgF_2$ powder was used, and as a sintering aid, for example, a carboxymethyl cellulose (CMC) solution was added in the proportion of 0.03-0.5% by weight (not included in 100) to 100 of the powder. The mixture was used as a starting raw material.

After filling the raw material into a mold form of a prescribed size, it was compressed at a molding pressure of 5 MPa or more using a uniaxial press molding device, and the molded article was further molded at a molding pressure of 5 MPa or more using a cold isostatic pressing (CIP) device.

Preliminary sintering was conducted by heating this CIP molded article in the temperature range between 550° C. and 600° C. in an air atmosphere, and the preliminary sintered article was heated in the temperature range just below the starting temperature of foaming (the temperature defined through the measurement using a differential thermal analyzer, about 850° C.) (750° C.-840° C.) for 4-16 hours in an air atmosphere or an inert gas atmosphere. By this heating, sintering was more uniformly promoted, and thereafter, the same was heated in the vicinity of the temperature limits in which a solid solution starts to be formed, that is, in the temperature range of 900° C.-1100° C. for 0.5-3 hours, and then cooled so as to produce a $MgF_2$ sintered body having a compact structure.

Figure 1:
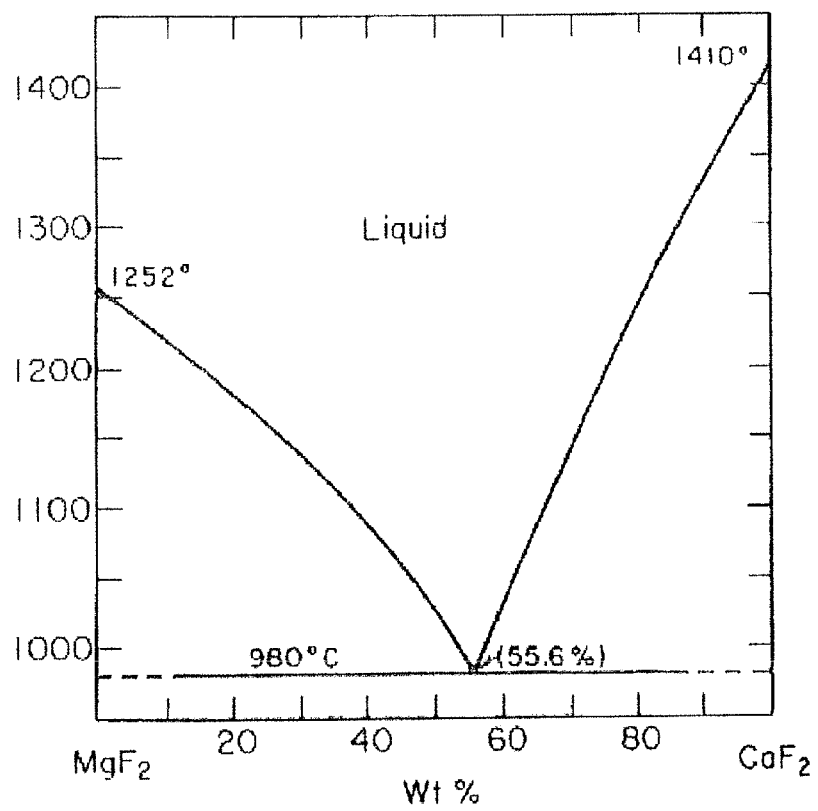
FIG. 1 is a phase diagram of the $MgF_2$—$CaF_2$ binary system.

As described above, in the phase diagram of the $MgF_2$—$CaF_2$ binary system shown in FIG. 1, the temperature at which a solid solution starts to be formed is in the temperature limits in the vicinity of 980° C. However, the present inventors presumed from the observation of the sections of actually sintered bodies, that there was a high possibility that a solid solution would be formed at a temperature dozens lower than 980° C., the temperature indicated in this phase diagram in the case of $MgF_2$ simple. Therefore, they considered that the vicinity of the temperature limits in which a solid solution starts to be formed should be 900° C. or more, and guessed that a solid solution would be formed even in the case of heating at a temperature less than 980° C.

Concerning the pulverization of $MgF_2$ being a raw material, balls for ball mill were filled into a pot mill, 3 kg of the raw material was filled therein and mixed for one week so as to be pulverized. The pot mill made of alumina, having an inside diameter of 200 mm and a length of 250 mm was used. As the filled balls made of alumina, ϕ5: 1800 g, ϕ10: 1700 g, ϕ20: 3000 g and ϕ30: 2800 g were used. The particle sizes of the raw material after pulverization were measured using a laser diffraction/scattering particle size distribution analyzer LA-920 made by HORIBA. Ltd. The median diameters were approximately 1.2 μm-1.3 μm.

As the sintering aid, two kinds, the CMC and calcium stearate, were selected.

With various addition proportions of each of them, the tests for examining the effects thereof were conducted. For comparison, a test with no sintering aid was also conducted.

Concerning mixing of the sintering aid, the two kinds of sintering aids were added in the proportion of 0-2% by weight, respectively. As is the case with the pulverization of the raw material, after filling the balls for ball mill into the pot mill, the sintering aid was mixed a whole day and night.

This mixed raw material was filled into a mold form of a uniaxial press molding device (mold size 220 mm×220 mm×H150 mm) and compression molding thereof was conducted at a press pressure of 20 MPa. Then, this press molded body was put into a vinyl bag and sealed, and it was put into a molding part of a CIP device (inside size: inside diameter 350 mm×height 120 mm). The space in said molding part was filled with clean water, and cool isostatic pressing (CIP) was conducted with variations of isostatic pressures by hydraulic pressure at room temperature.

Preliminary sintering was conducted on this CIP molded body in an air atmosphere with various kinds of heating conditions in the temperature range between 500° C. and 700° C. and in the time range of 3 to 18 hours. After observing the appearance of this preliminary sintered body, in a nitrogen gas atmosphere, the temperature was raised from room temperature to 550° C. at a fixed rate for 6 hours, and held there for 8 hours. Then, it was raised to 950° C. at a fixed rate for 2 hours and held there for 1 hour, and then lowered for 20 hours to 100° C. By observing the appearance of the taken-out sintered body and the compact state of the inside thereof, proper compositions, processing conditions and preliminary sintering conditions were investigated.

As a result, there was no big difference between the effects of the two kinds of sintering aids, but in the case of no sintering aid, the shape keeping performance of the uniaxial press molded body was poor, so that loss of shape frequently occurred in handling to the following CIP molding step. When the mix proportion of the sintering aid was 0.03% by weight or more, the loss of shape was not noticed, while coloring which appeared to be a residual of the sintering aid was sometimes noticed on the preliminary sintered body or sintered body when the mix proportion thereof exceeded 0.6% by weight. Accordingly, the proper range of the mix proportion of the sintering aid was decided to be 0.03-0.5% by weight.

When the molding pressure of the CIP device was less than 5 MPa, the bulk density of the sintered body in any of optimizing tests of the heating conditions of preliminary sintering and main sintering was lower by 2% or more than the case of the molding pressure of 5 MPa or more. For example, in the case of a molding pressure of 10 MPa, the bulk density of a sintered body sintered with the same sintering conditions was 2.95 g/cm$^3$, while in the case of a molding pressure of 4.8 MPa, the bulk density of a sintered body was 2.86 g/cm$^3$, 3% lower than the former. When the molding pressure was increased gradually from 5 MPa to 20 MPa, it was recognized that the bulk density of a sintered body after sintering tended to increase little by little. The tests were conducted until the molding pressure was gradually increased further to 50 MPa. The increase of the bulk density of a preliminary sintered body or a sintered body in the case of a molding pressure of 20 MPa or more was just slight, and a linear improvement like between 5 MPa and 20 MPa was not recognized. Accordingly, the proper value of the molding pressure was decided to be 5 MPa or more, preferably 20 MPa or more.

Figure 2:
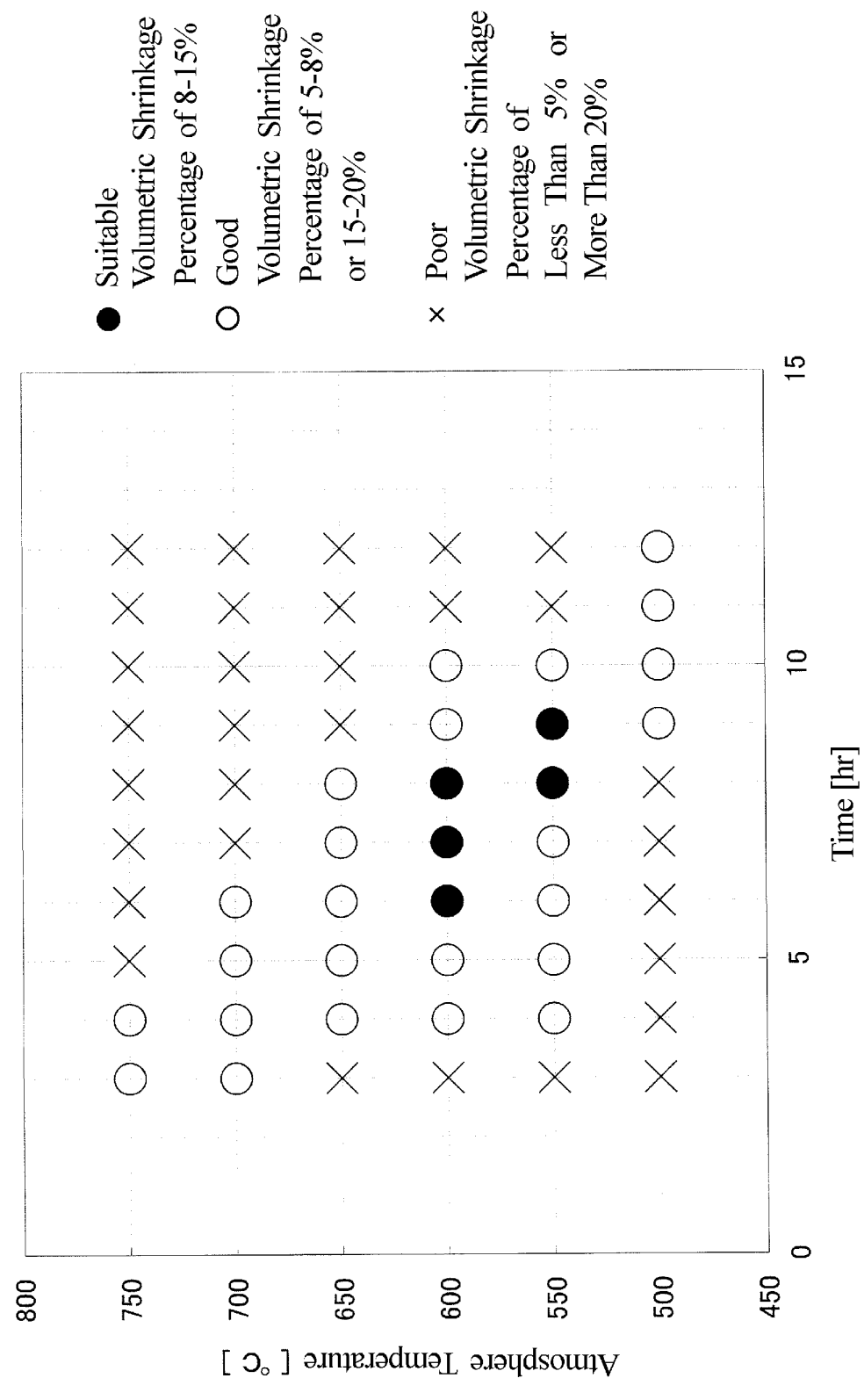
FIG. 2 is a diagram showing the relationship between the heating conditions in the preliminary sintering step and the shrinkage rates of preliminary sintered bodies.

Concerning the preliminary sintering conditions of a molded body in an air atmosphere, as shown in FIG. 2, at a heating temperature of less than 550° C. shrinkage was small compared with the size of the molded body, while at a heating temperature of 610° C. or more, the shrinkage was large and difficult to control. Accordingly, the proper range of the preliminary sintering temperature was decided to be between 550° C. and 600° C.

Concerning the proper value of the heating time, as shown in FIG. 2, at 550° C. 8-9 hours were optimal from the evaluation of the shrinkage rate, and it could be judged that 4-10 hours were proper. At 600° C., 6-8 hours were optimal, and it could be judged that 4-10 hours were proper. From these results, the heating condition of the preliminary sintering was decided to be at 550° C.-600° C. 4-10 hours in an air atmosphere.

The main sintering step important in producing a $MgF_2$ sintered body suitable for a neutron moderator and the sintering mechanism thereof are described below.

The definition of 'primary flocculation process' and 'secondary flocculation process' which are the terms expressing the degree of progress of the sintering step, is described below. The 'primary flocculation process' is the first half of the stage of sintering, and at the initial stage thereof, the intervals between particles gradually become narrower and the voids among particles also become smaller. Furthermore, the particle-to-particle contact portions become thick and the voids among them become small. Here, the majority of the voids are open pores connecting to the surrounding atmosphere. Such whole stage is called 'primary flocculation process'.

After the end of the primary flocculation process, with further progress of sintering, the open pores gradually decrease and turn into closed pores. Roughly the stage of turning into closed pores and the following stage of defoaming and compacting are called 'secondary flocculation process'.

In the present invention, due to pulverization of raw materials, particle size control, mixing of a sintering aid, uniaxial press molding, CIP molding, preliminary sintering and the like, it was recognized that the voids among particles of the preliminary sintered body were small, and that the voids almost uniformly scattered without gathering (the first half stage of the primary flocculation process).

In the heating process of the next main sintering step, the heating temperature is gradually raised. Around the preliminary sintering temperature limits (550° C.-600° C.), particles start to gather, and thereafter, solid phase reaction starts in the temperature limits far lower than 980° C. at which a solid solution starts to be formed. With that, flocculation of particles makes progress, the particle-to-particle distances become short and the voids become small. Here, in the case of heating at a relatively low temperature (in the vicinity of 550° C.) like preliminary sintering for a short period of time, most of the voids remain in the open pore state (the second half stage of the primary flocculation process).

It is generally said that the solid phase reaction starts in the temperature limits lower by the order of 10% or further lower than 980° C. From the observation of the sections of the sintered bodies in the preliminary test by the present inventors, it was considered that the solid phase reaction started in further lower temperature limits than generally said, at approximately 500° C. Its grounding is that at 550° C. the lowest limit of the proper preliminary sintering temperature, sintering had already made progress considerably and that the preliminary sintered body considerably shrunk compared with the molded body. In this preliminary test, the bulk volume shrunk in the order of 10-20% by volume. It was considered that the reaction made progress at a slow reaction rate in the temperature limits and that it made progress at a quite high reaction rate in the temperature limits in the vicinity of approximately 700° C. or more up to 980° C.

What attention should be paid to is behavior of fine bubbles (foaming gas) generated through vaporization of part of a raw material in the temperature limits of about 8500° C. or more. In the case of heating at about 850° C. or more, it was considered that the heating time should be as short as possible, since this formation of bubbles became noticeable.

Micro behavior of raw material particles is described below. Around a temperature exceeding 980° C. at which a solid solution starts to be formed, melting starts in the vicinity of a particle interface where fine particles of $MgF_2$ are present, and a solid solution of $MgF_2$ starts to be formed. As described by reference to FIG. 1, the present inventors presumed from the observation of the sections of the sintered bodies in the preliminary test that in the case of $MgF_2$ simple, a solid solution would start to be formed in the temperature limits in the order of dozens of degrees lower than 980° C. as the true state. It was presumed that this solid solution filled the voids among particles and that in some parts, more fine voids were also filled in through capillary phenomenon.

On the other hand, even if the heating temperature is lower than 980° C. by heating at about 700° C. or more for a long period of time as described above, the solid phase reaction makes progress, the voids gradually decrease with the elapse of time so as to be closed pores. Parallel with that, a gas component within the closed pores scatters within the bulk (parent) of the sintered body, leading to the progress of defoaming so as to make the sintered body compact with few bubbles (secondary flocculation process). Here, in order to make it compact by heating in the relatively low temperature limits of the order of 700° C., heating for a quite long period of time is required, resulting in low productivity and being uneconomical.

Also here, in heating at about 850° C. or more, attention should be paid to the presence of line bubbles (foaming gas) generated through vaporization of a raw material. It is presumed that the bubbles contain fluorine gas. Fluorine, the atomic number of 9, having an atomic weight of 18.998, is heavier than the air, and a relatively heavy element among light elements. The diffusion velocity thereof within the bulk (equivalent for the parent) of the sintered body is slow (it is difficult to diffuse), and it is considered that once formed bubbles do not easily disappear. As measures for suppressing foaming, to avoid heating in the temperature limits of foaming as much as possible, and to hold heating in the temperature limits thereof to a short period of time are exemplified.

The difference in appearance between such foaming gases and bubbles left after pores became closed but could not be defoamed in the sintering step (hereinafter, referred to as residual bubbles) is described below. The sizes of the foaming gases generated by general heating for a relatively short period of time are approximately several μm diameter, and the shapes thereof are almost perfect spheres. On the other hand, the sizes of the residual bubbles are all mixed up, large, medium and small, and the shapes thereof are not perfect spheres but irregular. Therefore, it is possible to distinguish the both according to the difference in shape. Here, in the case of heating at a high temperature far exceeding 980° C., or heating in the temperature limits exceeding 980° C. for a long period of time, a foaming gas and a foaming gas, or a residual bubble and a foaming gas gather and grow to a large irregular bubble, resulting in difficulty in judging its origin.

With the progress of the secondary flocculation process, the voids among particles become smaller, all or most of the voids are surrounded by particles or a bridge portion of the sintered body so as to be closed pores (bubbles). Depending on the conditions, gases are released through the voids (open pores), or gas components within the bubbles permeate into the bulk such as the particles or the bridge portion of the sintered body to degas, resulting in extinction of the bubbles (defoaming phenomenon). Whether the voids among particles are left as closed pores (bubbles) or by degassing, they do not remain as bubbles so as to disappear, is a significant element for deciding the degree of achievement of compactness of the sintered body, leading to the characteristics of the sintered body. Particularly in the case of sintering in an inert gas atmosphere (a light element gas such as He or Ne), it was considered that the lighter element easily diffused within the pores or bulk of the sintered body, leading to promoting the capillary phenomenon and defoaming phenomenon, and that bubbles were difficult to remain, leading to easy compacting. Thus, in order to make the whole compact, it is important to advance the primary flocculation process and the secondary flocculation process continuously with good balance.

In the present invention, the preliminary sintering step chiefly corresponding to the first half stage of the primary flocculation process and the main sintering step chiefly corresponding to the second half stage of the primary flocculation process and the secondary flocculation process are separately conducted, so as to make the two flocculation processes easy to make progress uniformly throughout the sintered body. However, it is meaningless to divide the sintering step into two steps of preliminary sintering and main sintering like this, if the heating conditions are not proper. For example, in the case of heating at a high temperature exceeding the proper limits in the preliminary sintering step, in the case of rapidly heating at the temperature raising stage of the main sintering step, or in cases where the holding temperature in the main sintering step is a high temperature exceeding the proper limits, a remarkable difference in the degree of compactness is caused between the periphery portion of the sintered body and the inside thereof. When such situation is caused, degassing becomes difficult in the process of compacting the inside of the sintered body, resulting in insufficient compactness of the inside thereof. Therefore, it is important to make the heating temperature pattern in the sintering step according to the size proper.

As described above, the proper conditions till just before the main sintering step are disclosed. The preliminary sintered body provided to this main sintering step is in a state that the whole body has already advanced to the first half stage of the primary flocculation. What is important here is the whole of the preliminary sintered body has already advanced uniformly to the middle of the primary flocculation.

In order to find a method for producing a fluoride sintered body suitable for a neutron moderator, various kinds of main sintering steps were conducted.

Preliminary sintered bodies obtained by conducting uniaxial press molding and CIP molding on a compound material made of $MgF_2$ being a pulverized raw material with CMC of 0.2% by weight as a sintering aid added thereto and conducting preliminary sintering thereon at 550° C. for 6 hours were used. In any case, the heating time was set to be 6 hours. In each case of a sintering temperature varying between 600° C. and 1200° C., at an interval of every 50° C., the bulk density of the sintered body was measured. In the case of a range approximately between 900° C. and 1100° C., the bulk densities exceeded 2.90 g/cm$^3$, which were high, but in either case of a sintering temperature of 850° C. or less, and that of 1150° C. or more, the bulk densities were lower than 2.90 g/cm$^3$. When observing the sections of those sintered bodies, in the case of those sintered at 800° C. or less, the bridge widths of the sintering portions were narrow, so that it could be judged as absolutely insufficient progress of sintering. In the case of a body sintered at 850° C. a few open pores were noticed. In the case of a body sintered at 1100° C., some irregular bubbles were found inside, and in the case of those sintered at 1150° C. or more, those had a porous pumiceous structure as if irregular bubbles were innumerably formed inside. Fine bubbles which were almost perfect spheres of several to dozen μm in diameter were observed all over the sintered body and innumerable irregular bubbles of 10 μm or more in diameter were found all over the sections observed. It could be judged that these perfect sphere bubbles were foaming gases from their shapes, and that these irregular bubbles were bubbles in clusters similarly from their shapes.

On the other hand, from the examination by the present inventors, it was found out that in the process of heating the $MgF_2$ raw material obtained by pulverizing those as measured by a differential thermal analyzer, the weight clearly started to decrease at about 800° C., and that the weight started to drastically decrease at about 850° C. This means that a sublimation phenomenon in which $MgF_2$ starts to dissolve/vaporize to generate fluorine gas starts at about 800° C., and that this phenomenon becomes brisk at about 850° C. (what is called presenting a foaming phenomenon).

Through this sublimation, as described above, fine bubbles are formed all over the sintered body. The behavior of the formed fine bubbles (foaming gases) such as defoaming or remaining as bubbles is decided according to the degree of progress of the sintering step, in which portion of the sintered body they were formed and the like.

In the primary flocculation process, for example, since the whole sintered body contains mainly open pores, the majority of bubbles are defoamed through the open pores, leading to few bubbles left. In the secondary flocculation process, since the sintered body contains mainly closed pores, a lot of foaming gases cannot be defoamed, leading to bubbles left. Basically it can be said that to swiftly complete the sintering in the secondary flocculation process is a course to be taken to reduce residual bubbles.

Thus, it is preferable that the transition from the primary flocculation process to the secondary flocculation process should be advanced in the whole sintered body with as small a time lag as possible. However, it is not easy to undergo the transition from the primary flocculation process to the secondary flocculation process in the whole sintered body without time lag.

Then, the present inventors decided to complete the primary flocculation process and the first half of the secondary flocculation process by heating at a rather low temperature in the temperature limits just below the starting temperature of foaming (about 850° C.) for a relatively long period of time, and then, to complete the second half of the secondary flocculation process by heating at a temperature in the vicinity of the temperature at which a solid solution starts to be formed (980° C.) for a relatively short period of time. They found out that this was an excellent sintering method by which the degree of progress of sintering in the whole sintered body could be made uniform with formation of few foaming gases.

The proper range of the sintering conditions is described below. As preliminary sintering, a molded body was held at 600° C. for (hours in an air atmosphere. The preliminary sintered body was about 212 mm×212 mm×t72 mm in size and a cuboid shape with two square surfaces on the top and bottom.

The heating atmosphere was set to be a nitrogen gas atmosphere. Preliminary tests concerning each of heating and cooling conditions in the heating pattern were conducted in three cases of the required time of 3, 6 and 9 hours. As a result, in the case of 3 hours, small cracks occurred in the sintered body, while in the other cases, the results were good. Therefore, the required time was set to be 6 hours.

Figure 3:
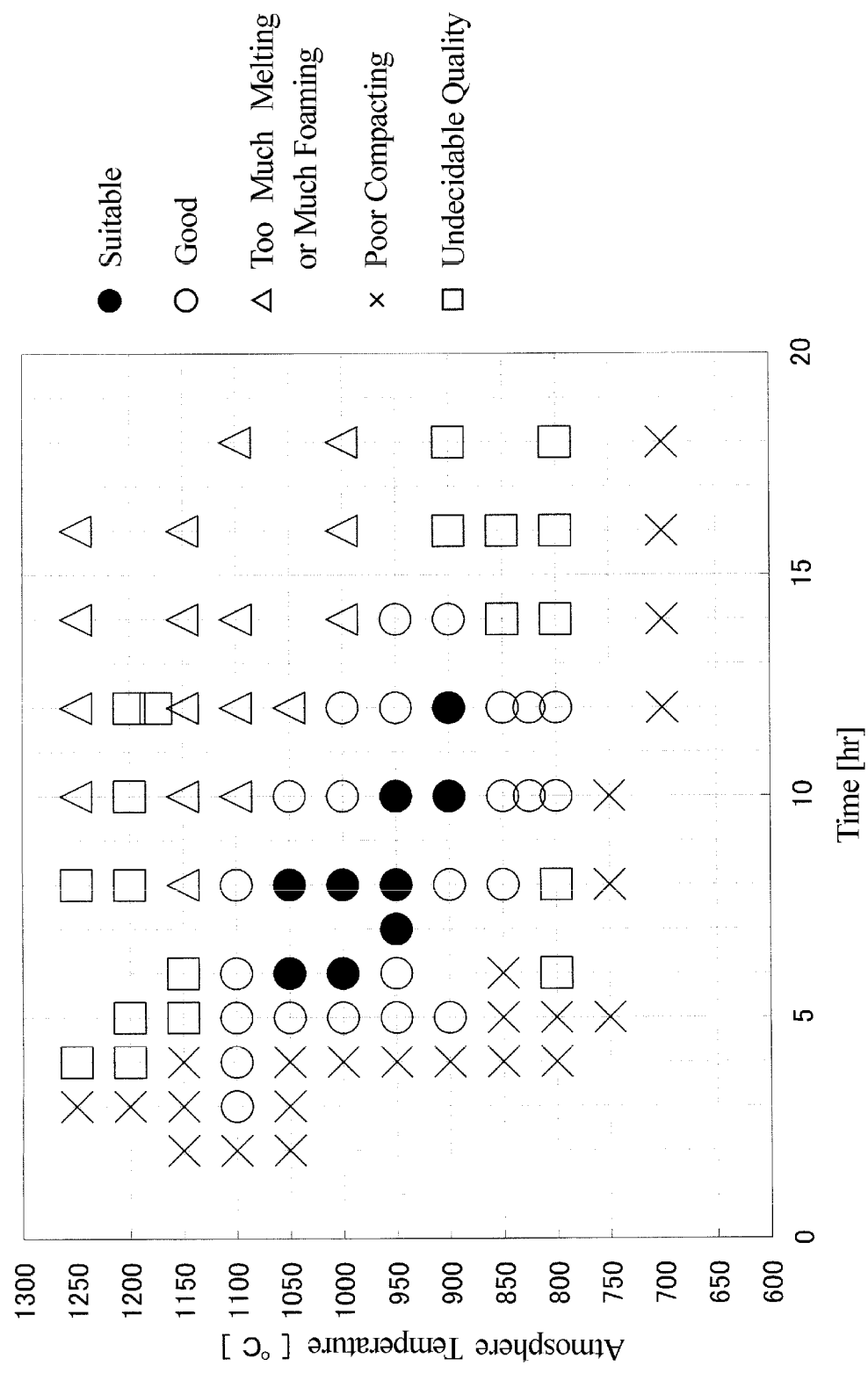
FIG. 3 is a diagram showing the relationship between the heating conditions in the sintering step in a nitrogen gas atmosphere and the formation states of sintered bodies.

The heating atmosphere was continuously set to be the nitrogen gas atmosphere. The heating temperature was varied in the range of 700° C. to 1250° C., and in eleven cases of the holding time of 2, 3, 4, 5, 6, 8, 10, 12, 14, 16 and 18 hours, the tests were conducted. As shown in FIG. 3, in the case of 750° C. or less, the compactness was insufficient, regardless of the holding time. In the case of a holding time of 4 hours or less, the compactness was insufficient in any case other than 1100° C. On the other hand, in the case of a heating temperature exceeding 1150° C., a large number of bubbles were generated due to too fast sintering speed, regardless of the holding time, while in the case of a holding time of 16 hours or more, foaming occurred in part of the periphery of the sintered body, leading to getting out of shape in appearance.

Reviewing the results in FIG. 3 in detail, in the case of heating at 850° C., the sintering state was good with a holding time of 8 hours or more, while slightly insufficient with 6 hours or less.

In the case of 900° C., the sintering state was good with a holding time of 5 hours or more, while slightly insufficient with 4 hours or less, and beyond decision of quality with 16 hours or more.

In the case of 950° C., the sintering state was good with a holding time of 5 to 14 hours, while slightly insufficient with 4 hours or less, and beyond decision of quality with 15 hours or more.

In the case of 1000° C. the sintering state was good with a holding time of 5 to 12 hours, while slightly insufficient with 4 hours or less, and much foaming with 14 hours or more.

In the case of 1100° C., the sintering state was good with a holding time of 3 to 8 hours, while much foaming with 10 hours or more.

In the case of 1150° C., much foaming was seen with any holding time.

In the case of 1200° C., the sintering was insufficient with a holding time of 3 hours or less, while beyond decision of quality or poor because of too much melting with 4 hours or more.

When the heating temperature was a comparatively low temperature of 800° C. to 850° C., the sintering was slightly insufficient when the holding time was between 4 and 8 hours. However, since the main sintering step was divided into two, the first main sintering step and the following second main sintering step in the present invention, that was regarded as being good as the evaluation in the first main sintering step.

In order to examine the relationship among the heating temperature, the bulk density of the sintered body and the mass decrease TG thereof corresponding to a yield, using the same preliminary sintered body as the above, the holding time was set to be 6 hours, and the heating temperature was varied within the range of 600° C. to 1300° C.

As a result, in the case of a heating temperature of 900° C., the bulk density was approximately 2.90 g/cm$^3$. Like the results shown in FIG. 3, the sintered body having a bulk density of that or more could be judged to have sufficient compactness without troubles such as losing its shape in the treatment of the second step.

On the other hand, in the case of a heating temperature of 1150° C. or more, the mass decrease TG was −0.8% or more, and the decrease of the yield was remarkable. When the heating temperature was more than that, foaming occurred in part of the periphery of the sintered body, resulting in a trouble such as getting out of shape in appearance.

From the results shown in FIG. 3, it could be judged that, if the sintering step was one of the heating steps, the heating temperature of 850° C. to 1100° C. and the holding time of 3 to 14 hours (high-temperature short-time heating, or low-temperature relatively-long-time heating within these ranges) were proper conditions.

What was clarified here is, when relatively long time heating, such as at 900° C. for 16 hours or more, at 1000° C. for 14 hours or more, or at 1100° C. for 10 hours or more, was conducted, the quantity of bubbles was large and part of those gathered and was growing to a large bubble. It was confirmed that such sintered body involved defects which would cause cracks to occur from a large bubble portion or cause splitting in the next mechanical processing step.

From these situations, the present inventors decided as a fundamental plan of the main sintering step that foaming should be suppressed as much as possible, as well as the sintering reaction should be allowed to sufficiently make progress, leading to producing a sintered body having a good processability in the subsequent mechanical processing step.

The fundamental plan at the beginning of the main sintering step was that forming should be tried not to occur as much as possible, that the sintering should be allowed to make slow progress, and that the difference between the degree of progress of the inner portion of the sintered body and that of the periphery portion thereof should be kept as small as possible. The heating temperature limits were decided to be within the range of 800° C. to 1100° C. as described above. Since the temperature at which foaming became noticeable was about 850° C., the heating temperature at the beginning of the main sintering step was set to be below 850° C., 840° C. or less, that is, from 750° C. to 840° C., and the holding time was set to be 5 to 12 hours.

Heating at the next stage of enhancing the sintering reaction of the sintered body was decided to be conducted in the temperature limits in the vicinity of 980° C. at which a solid solution started to be formed, that is, 900° C. to 1100° C. within the above proper conditions. The holding time was decided to be made as short as possible in order to enhance the sintering reaction and suppress foaming. Judging from the results in FIG. 3 and the below-described examples and comparative examples, the holding time was decided to be 0.5 to 3 hours, since the enhancement of the sintering reaction was poor in the case of less than 0.5 hour, and too many bubbles were formed in the case of 4 hours or more.

When the atmospheric gas was changed to helium, the results were not different from those in the case of nitrogen gas. At less than 800° C., the compactness was not sufficient regardless of the holding time, and in the case of a holding time of 4 hours or less, the compactness was insufficient. In the case of 1110° C. or more, the sintering speed was too fast regardless of the holding time as is the case with the nitrogen gas, resulting in occurrence of many bubbles, and in the case of a holding time of 4 hours or more, because of foaming, the appearance got out of shape in some cases.

In order to examine the relationship among the heating temperature, the bulk density of the sintered body and the mass decrease TG thereof corresponding to a yield, using the same preliminary sintered body as the above, the holding time was set to be 6 hours, and the heating temperature was varied within the range of 600° C. to 1300° C. As a result, as is the case with the nitrogen gas, the bulk density was approximately 2.90 g/cm$^3$ at a heating temperature of 900° C. It was judged that the sintered body having a bulk density of that or more would not lose its shape in the treatment of the subsequent step, as is the case with the nitrogen gas, resulting in having sufficient compactness. On the other hand, at a heating temperature of 1110° C. or more, the mass decrease TG was −0.8% or more and the yield decrease was remarkable. And foaming occurred in part of the periphery of the sintered body, resulting in a trouble such as getting out of shape in appearance.

Therefore, it was judged that the heating temperature of 900° C. to 1100° C. and the holding time of 0.5 to 2.5 hours were proper conditions. Furthermore, since in the case of a heating temperature of 950° C. to 1050° C. and a holding time of 0.5 to 3 hours, defects such as cracks were difficult to occur when providing the sintered body to the mechanical processing, resulting in good mechanical processability, it was judged that the heating temperature of 950° C. to 1050° C. and the holding time of 0.5 to 3 hours were desirable. Therefore, as proper heating conditions of the main sintering step in a helium gas atmosphere, as is the case with the above nitrogen gas atmosphere, the proper condition of the first heating of the main sintering step was at 750° C. to 840° C. for a holding time of 5 to 12 hours, while that of the second heating thereof was at 900° C. to 1100° C. for a holding time of 0.5 to 3 hours.

The inert gas is not limited to nitrogen and helium. In the case of argon or neon, the same effects can be obtained. Since neon is expected to have a high resolution degree or a scattering characteristic in the parent of this sintered body, like helium, the defoaming phenomenon can be further promoted and an improvement thereby equal to or more than that by helium can be expected.

When the heating conditions of the main sintering step were within the proper range, the state of the completed sintered body was wholly compact in any case, and no clearly defective portion such as a locally large void or a crack seen in a general ceramic sintered body could be found.

EXAMPLES

The present invention is more specifically described below by reference to Examples, but the present invention is not limited to these Examples.

First, a typical characteristic evaluation test conducted on sintered bodies in the Examples is described.

In order to evaluate the neutron moderation performance, a beam emitted from an accelerator is allowed to collide with Be being a target, and by nuclear reaction, high-energy neutrons (fast neutrons) are mainly generated. Using Pb and Fe each having a large inelastic scattering cross section as a moderator in the first half of moderation, the neutrons are moderated to some extent (approximately up to 1 MeV) while suppressing the attenuation of the number of neutrons. These are irradiated to a moderator to be evaluated (a moderator in the second half of moderation), and by examining the neutrons after moderation, the moderator is evaluated. The measurement of the contents of the neutrons (hereinafter, referred to as a 'neutron flux') was conducted according to the method devised by the present inventors (the above Non-Patent Document 3). The total thickness of each moderator in the second half to be evaluated was set to be 320 mm, and two kinds of moderators, $MgF_2$ and $CaF_2$ were selected.

Furthermore, the case wherein $MgF_1$ and $CaF_2$ were superposed on each other (the total thickness was set to be 320 mm) was also evaluated.

Figure 4:
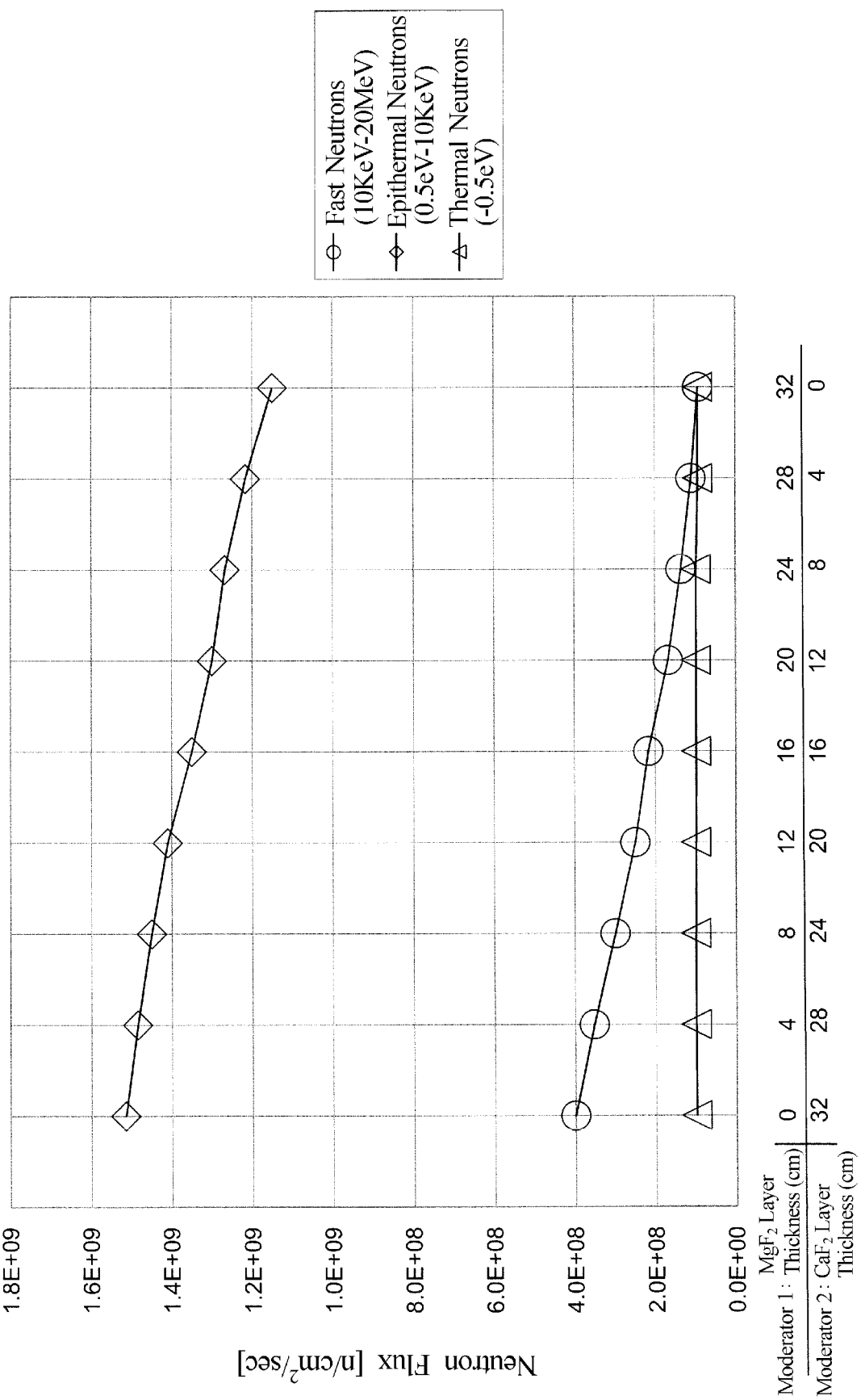
FIG. 4 is a diagram showing alterations of the neutron type after moderation (alterations of the mixed fast neutron dose and the epithermal neutron dose suitable for therapy, after moderation) when a $MgF_2$ sintered body and a $CaF_2$ sintered body are superposed on each other as a moderator.

What was evaluated here is how many fast neutrons having high possibilities of adversely influencing a patient remained in the neutrons moderated by the moderator. The results are shown in FIG. 4. Here, as $MgF_2$ and $CaF_2$, compact sintered bodies thereof each having a relative density (100×(actual density)/(true density), unit %) of 95±2% were used.

From FIG. 4, as the layer thickness of $MgF_2$ increases as a moderator, (goes in a right direction on the axis of abscissas), the number of fast neutrons having possibilities of adversely influencing a patient decreases. In the case of $MgF_2$ only, compared with the case of $CaF_2$ only, the number thereof could be reduced to about ⅓ to ¼. It can be known that $MgF_2$ is superior as a moderator.

Using the above evaluation device, in the same manner, how the relative density (i.e. the compactness) of $MgF_2$ influences the moderation performance was examined. As a moderator, only $MgF_2$ sintered bodies, having a relative density of 90% to 97% were used.

The results are shown in Table 1. The higher relative density the sintered body had, the less the quantity of mixed fast neutrons was, leading to obtaining excellent performance as a moderator. The sintered bodies having a relative density of less than 92% were varied in moderation performance. Some unstable cases, wherein the quantity of mixed fast neutrons suddenly increased, or the epithermal neutron dose drastically increased, were noticed. This appears to be because insufficient compactness resulted in insufficient moderation performance, or with the formation of open pores, impurities were mixed in the sintered body in molding thereof, resulting in irregular influence on the moderation performance. In order to allow the sintered body to present stable moderation performance, it was found that the relative density of 92% or more, that is, the bulk density of 2.90 g/cm$^3$ or more was required.

As evaluation indexes of mechanical strength, bending strength and Vickers hardness were adopted. The samples for bending strength, having a size of 4 mm×46 mm×t3 mm with the upper and lower surfaces optically polished were prepared according to JIS C2141, and tested according to the three-point bending test JIS R1601. To obtain the Vickers hardness, using 'Micro Hardness Tester' made by Shimadzu Corporation, an indenter having a load of 100 g was pressed for 5 seconds of loading time so as to measure the diagonal length of the impression, which was converted into hardness.

$$Hardness = 0.18909 \times P/(d)^2$$

Here, P: load (N) and d: diagonal length of impression (mm)

Example 1

A high-purity $MgF_2$ raw material (mean particle diameter of 20 μm and purity of 99.9% by weight or more) was pulverized using the pot mill and alumina balls described in the 'Mode for Carrying Out the Invention', to a high-purity $MgF_2$ powder (mean particle diameter of 1.2 μm and purity of 99.9% by weight or more). To the powder, a carboxymethyl cellulose (CMC) solution was added as a sintering aid in the proportion of 0.2% by weight to 100 of the $MgF_2$ powder, and mixed in the pot mill for 12 hours so as to be a starting raw material.

This starting raw material was filled into a mold form (mold size of 220 mm×220 mm×H150 mm) using a uniaxial press device and compressed at a uniaxial press pressure of 10 MPa to be molded.

This press molded body (size of about 220 mm×220 mm×t85 mm), which was put into a thick vinyl bag and sealed after deairing, was put into a molding part (inside size: inside diameter 350 mm×H120 mm) of a cold isostatic pressing (CIP) device. Clean water was filled into the space between the vinyl bag with this press molded body therein and the molding part of the CIP device, and isostatic pressing was conducted at a molding pressure of 20 MPa, resulting in a CIP molded body (size of about 215 mm×215 mm×t75 mm).

Preliminary sintering at 600° C. for 5 hours in an air atmosphere was conducted on this molded body, resulting in a preliminary sintered body having a size of about 208 mm×208 mm t72 mm.

This preliminary sintered body was heated from room temperature to 830° C. at a fixed rate for 6 hours in a nitrogen gas atmosphere, and the temperature was held there for 6 hours. It was then raised to 1000° C. at a fixed rate for 2 hours and held there for 1 hour. Heating was then stopped, and the temperature was lowered by self-cooling (furnace cooling) for about 20 hours to 100° C. at which time it was previously set to take out the sintered body, after which it was taken out.

The bulk density of the sintered body was calculated at 3.05 $g/cm^3$ (relative density of 96.8%) from the rough size (193 mm×193 mm×t62 mm) and the weight thereof. The sintering state was good. Since the appearance of the sintered body was a square form in a plan view, the 'bulk density' here was obtained by a method wherein the bulk volume was calculated from the measured two sides of the square and thickness, and the weight separately measured was divided by the bulk volume. This also applied to the following.

Using samples taken from this sintered body, by the method shown in the Non-Patent Document 3, evaluation tests of neutron moderation performance and characteristics of every kind were conducted. The results are shown in Table 1. This also applied to the following Examples and Comparative Examples.

Concerning the neutron moderation performance, the decrease of epithermal neutron dose was slightly small compared with $CaF_2$ as a comparative material, but the dose of fast neutrons having high possibilities of adversely influencing a patient was reduced to about ¼, so that it was found that $MgF_2$ had an excellent moderation performance.

As shown in Table 2, the other mechanical strengths were also good without problems.

Example 2

Using the same starting raw material as in the above Example 1, preliminary sintering at 550° C. for 10 hours in an air atmosphere was conducted on a molded body to which uniaxial press molding and cold isostatic pressing (CIP) were applied in the same manner, so as to obtain a preliminary sintered body of 208 mm×208 mm×t73 mm. This preliminary sintered body was heated from room temperature to 750° C. at a fixed rate for 6 hours in a nitrogen gas atmosphere, and the temperature was held there for 9 hours. It was then raised to 920° C. at a fixed rate for 2 hours and held there for 2 hours. The temperature was then lowered by furnace cooling to 100° C. at which time it was previously set to take out the sintered body, after which it was taken out. The rough size of the sintered body was 195 mm×195 mm×t64 mm, the bulk density thereof was 2.90 $g/cm^3$ (relative density of 92.1%), and the sintering state was good.

Any of the evaluation results of the neutron moderation performance and characteristics of every kind were good as shown in Table 2.

Example 3

Using the same starting raw material as in the above Example 1, preliminary sintering at 600° C. for 8 hours in an air atmosphere was conducted on a molded body to which uniaxial press molding and cold isostatic pressing (CIP) were applied in the same manner, so as to obtain a preliminary sintered body of 206.5 mm×207 mm×t71 mm. This preliminary sintered body was heated from room temperature to 840° C. at a fixed rate for 6 hours in a nitrogen gas atmosphere, and the temperature was held there for 12 hours. It was then raised to 1080° C. at a fixed rate for 2 hours and held there for 1 hour. The temperature was then lowered by furnace cooling to 100° C. at which time it was previously set to take out the sintered body, after which it was taken out. The rough size of the sintered body was 192 mm×192 mm×t61 mm, the bulk density thereof was 3.00 $g/cm^3$ (relative density of 95.2%), and the sintering state was good.

Any of the evaluation results of the neutron moderation performance and characteristics of every kind were good as shown in Table 2.

Example 4

Using the same starting raw material as in the above Example 1, this raw material was filled into the mold form of uniaxial press molding and compressed at a uniaxial press pressure of 70 MPa to be molded. Then, molding was conducted using the cold isostatic pressing (CIP) device at a molding pressure of 40 MPa, so as to obtain a molded body (size of about 213 mm×214 mm×t74 mm).

Preliminary sintering at 600° for 10 hours in an air atmosphere was conducted on this molded body to obtain a preliminary sintered body of 204.5 mm×205 mm×t70 mm. This preliminary sintered body was heated from room temperature to 830° C. at a fixed rate for 6 hours in a nitrogen gas atmosphere, and the temperature was held there for 12 hours. It was then raised to 1080° C. at a fixed rate for 2 hours and held there for 1 hour. The temperature was then lowered by furnace cooling to 100° C. at which time it was previously set to take out the sintered body, after which it was taken out. The rough size of the sintered body was 190.5 mm×191 mm×t60 mm, the bulk density thereof was 3.07 $g/cm^3$ (relative density of 97.5%), and the sintering state was good.

Any of the evaluation results of the neutron moderation performance and characteristics of every kind were good as shown in Table 2.

Example 5

Using the same starting raw material as in the above Example 1, preliminary sintering at 580° C. for 10 hours in an air atmosphere was conducted on a molded body to which uniaxial press molding and cold isostatic pressing (CIP) were applied in the same manner, so as to obtain a preliminary sintered body of 206 mm×206 mm×t70.5 mm. This preliminary sintered body was heated from room temperature to 800° C. at a fixed rate for 6 hours in a nitrogen gas atmosphere, and the temperature was held there for 12 hours. It was then raised to 920° C. at a fixed rate for 2 hours and held there for 3 hours. The temperature was then lowered by furnace cooling to 100° C. at which time it was previously set to take out the sintered body, after which it was taken out. The rough size of the sintered body was 191.0 mm×191.5 mm×t62 mm, the bulk density thereof was 3.02 g/cm³ (relative density of 95.9%), and the sintering state was good.

Any of the evaluation results of the neutron moderation performance and characteristics of every kind were good as shown in Table 2.

Example 6

Using the same starting raw material as in the above Example 1, preliminary sintering at 580° C. for 7 hours in an air atmosphere was conducted on a molded body to which uniaxial press molding and cold isostatic pressing (CIP) were applied in the same manner, so as to obtain a preliminary sintered body of 207 mm×207 mm×t71.5 mm. This preliminary sintered body was heated from room temperature to 830° C. at a fixed rate for 6 hours in a nitrogen gas atmosphere, and the temperature was held there for 12 hours. It was then raised to 1000° C. at a fixed rate for 2 hours and held there for 3 hours. The temperature was then lowered by furnace cooling to 100° C. at which time it was previously set to take out the sintered body, after which it was taken out. The rough size of the sintered body was 192.5 mm×192.5 mm×t63 mm, the bulk density thereof was 2.99 g/cm³ (relative density of 94.9%), and the sintering state was good.

Any of the evaluation results of the neutron moderation performance and characteristics of every kind were good as shown in Table 2.

Example 7

Using the same starting raw material as in the above Example 1, preliminary sintering at 580° C. for 10 hours in an air atmosphere was conducted on a molded body to which uniaxial press molding and cold isostatic pressing (CIP) were applied in the same manner, so as to obtain a preliminary sintered body of 206 mm×206 mm×t70.5 mm. This preliminary sintered body was heated from room temperature to 840° C. at a fixed rate for 6 hours in a nitrogen gas atmosphere, and the temperature was held there for 8 hours. It was then raised to 980° C. at a fixed rate for 2 hours and held there for 3 hours. The temperature was then lowered by furnace cooling to 100° C. at which time it was previously set to take out the sintered body, after which it was taken out. The rough size of the sintered body was 193 mm 193.5 mm×t62.5 mm, the bulk density thereof was 2.96 g/cm³ (relative density of 94.0%), and the sintering state was good.

Any of the evaluation results of the neutron moderation performance and characteristics of every kind were good as shown in Table 2.

Example 8

Using the same starting raw material as in the above Example 1, preliminary sintering at 560° C. for 8 hours in an air atmosphere was conducted on a molded body to which uniaxial press molding and cold isostatic pressing (CIP) were applied in the same manner, so as to obtain a preliminary sintered body of 207 mm×206 mm×t70.5 mm. This preliminary sintered body was heated from room temperature to 8409° C. at a fixed rate for 6 hours in a nitrogen gas atmosphere, and the temperature was held there for 5 hours. It was then raised to 920° C. at a fixed rate for 2 hours and held there for 3 hours. The temperature was then lowered by furnace cooling to 100° C. at which time it was previously set to take out the sintered body, after which it was taken out. The rough size of the sintered body was 194.5 mm×194.5 mm×t64 mm, the bulk density thereof was 2.91 g/cm³ (relative density of 92.4%), and the sintering state was good.

Any of the evaluation results of the neutron moderation performance and characteristics of every kind were good as shown in Table 2.

Example 9

Using the same starting raw material as in the above Example 1, preliminary sintering at 580° C. for 10 hours in an air atmosphere was conducted on a molded body to which uniaxial press molding and cold isostatic pressing (CIP) were applied in the same manner, so as to obtain a preliminary sintered body of 205 mm×205 mm×170.5 mm. This preliminary sintered body was heated from room temperature to 840 t at a fixed rate for 6 hours in a helium gas atmosphere, and the temperature was held there for 8 hours. It was then raised to 980° C. at a fixed rate for 2 hours and held there for 3 hours. The temperature was then lowered by furnace cooling to 100° C. at which time it was previously set to take out the sintered body, after which it was taken out. The rough size of the sintered body was 192.5 mm×192.5 mm×t62 mm, the bulk density thereof was 3.00 g/cm³ (relative density of 95.2%), and the sintering state was good.

Any of the evaluation results of the neutron moderation performance and characteristics oft every kind were good as shown in Table 2.

Example 10

Using the same starting raw material as in the above Example 1, preliminary sintering at 560° C. for 6 hours in an air atmosphere was conducted on a molded body to which uniaxial press molding and cold isostatic pressing (CIP) were applied in the same manner, so as to obtain a preliminary sintered body of 207 mm×207 mm×t70.5 mm. This preliminary sintered body was heated from room temperature to 770° C. at a fixed rate for 6 hours in a nitrogen gas atmosphere, and the temperature was held there for 10 hours. It was then raised to 900° C. at a fixed rate for 2 hours and held there for 3 hours. The temperature was then lowered by furnace cooling to 100° C. at which time it was previously set to take out the sintered body, after which it was taken out. The rough size of the sintered body was 194.5 mm×194.5 mm×t64 mm, the bulk density thereof was 2.90 g/cm³ (relative density of 92.1%), and the sintering state was good.

Any of the evaluation results of the neutron moderation performance and characteristics of every kind were good as shown in Table 2.

Example 11

Using the same starting raw material as in the above Example 1, preliminary sintering at 550° C. for 8 hours in an air atmosphere was conducted on a molded body to which uniaxial press molding and cold isostatic pressing (CIP)

were applied in the same manner, so as to obtain a preliminary sintered body of 207 mm×207 mm×t70 mm. This preliminary sintered body was heated from room temperature to 790° C. at a fixed rate for 6 hours in a nitrogen gas atmosphere, and the temperature was held there for 6 hours. It was then raised to 940° C. at a fixed rate for 2 hours and held there for 1.5 hours. The temperature was then lowered by furnace cooling to 100° C. at which time it was previously set to take out the sintered body, after which it was taken out. The rough size of the sintered body was 194.5 mm×194.5 mm×t64 mm, the bulk density thereof was 2.91 g/cm (relative density of 92.4%), and the sintering state was good.

Any of the evaluation results of the neutron moderation performance and characteristics of every kind were good as shown in Table 2.

Comparative Example 1

Using the same starting raw material as in the above Example 1, preliminary sintering at 550° C. for 10 hours in an air atmosphere was conducted on a molded body to which uniaxial press molding and cold isostatic pressing (CIP) were applied in the same manner, so as to obtain a preliminary sintered body of 208 mm×208 mm×t73 mm. This preliminary sintered body was heated from room temperature to 750° C. at a fixed rate for 6 hours in a nitrogen gas atmosphere, and the temperature was held there for 9 hours. It was then raised to 920° C. at a fixed rate for 2 hours and held there for 2 hours. The temperature was then lowered by furnace cooling to 100° C. at which time it was previously set to take out the sintered body, after which it was taken out. The rough size of the sintered body was 195 mm×195 mm×t64 mm, the bulk density thereof was 2.90 g/cm$^3$ (relative density of 92.1%), and the sintering state was good.

As the evaluation results of the neutron moderation performance and characteristics of every kind, as shown in Table 2, a large quantity of fast neutrons having possibilities of adversely influencing the body remained in the neutron flux after moderation. There was a problem left that the moderation effect could not be sufficiently obtained. In addition, there was a problem of low mechanical strength.

Comparative Example 2

Using the same starting raw material as in the above Example 1, preliminary sintering at 530° C. for 5 hours in an air atmosphere was conducted on a molded body to which uniaxial press molding and cold isostatic pressing (CIP) were applied in the same manner, so as to obtain a preliminary sintered body of 209 mm×209 mm×t76 mm. This preliminary sintered body was heated from room temperature to 740° C. at a fixed rate for 6 hours in a nitrogen gas atmosphere, and the temperature was held there for 4 hours. It was then raised to 890° C. at a fixed rate for 2 hours and held there for 2 hours. The temperature was then lowered by furnace cooling to 100° C. at which time it was previously set to take out the sintered body, after which it was taken out. The rough size of the sintered body was 198 mm×198 mm×t68 mm, the bulk density thereof was 2.80 g/cm$^3$ (relative density of 88.9%), and the sintering state was obviously porous and inconvenient, leading to a problem in handling.

As the evaluation results of the neutron moderation performance and characteristics of every kind, as shown in Table 2, a large quantity of fast neutrons having possibilities of adversely influencing the body remained in the neutron flux after moderation. There was a problem left that the moderation effect could not be sufficiently obtained. In addition, there was a problem of unmeasurably low mechanical strength.

Comparative Example 3

Using the same starting raw material as in the above Example 1, preliminary sintering at 550° C. for 10 hours in an air atmosphere was conducted on a molded body to which uniaxial press molding and cold isostatic pressing (CIP) were applied in the same manner, so as to obtain a preliminary sintered body of 208 mm×208 mm×t73 mm. This preliminary sintered body was heated from room temperature to 750° C. at a fixed rate for 6 hours in a nitrogen gas atmosphere, and the temperature was held there for 9 hours. It was then raised to 880° C. at a fixed rate for 2 hours and held there for 1.5 hours. The temperature was then lowered by furnace cooling to 100° C. at which time it was previously set to take out the sintered body, after which it was taken out. The rough size of the sintered body was 197 mm×196 mm×t67 mm and the bulk density thereof was 2.88 g/cm$^3$ (relative density of 91.4%). The sintering state was good in appearance, but at the stage of grinding wherein the sintered body was finished using a grinder, a phenomenon that a grinding fluid was absorbed into the sintered body was recognized. Therefore, the microstructure of the inside of the sintered body was examined in detail. As a result, it was clarified that a large number of open pores were formed, resulting in insufficient sintering.

As the evaluation results of the neutron moderation performance and characteristics of every kind, as shown in Table 2, a large quantity of fast neutrons having possibilities of adversely influencing the body remained in the neutron flux after moderation. There was a problem left that the moderation effect could not be sufficiently obtained. In addition, there was a problem of low mechanical strength.

Comparative Example 4

Using the same starting raw material as in the above Example 1, preliminary sintering at 600° C. for 10 hours in an air atmosphere was conducted on a molded body to which uniaxial press molding and cold isostatic pressing (CIP) were applied in the same manner, so as to obtain a preliminary sintered body of 208 mm×208 mm×t73 mm. This preliminary sintered body was heated from room temperature to 840° C. at a fixed rate for 6 hours in a nitrogen gas atmosphere, and the temperature was held there for 8 hours. It was then raised to 1150° C. at a fixed rate for 2 hours and held there for 3 hours. The temperature was then lowered by furnace cooling to 100° C. at which time it was previously set to take out the sintered body, after which it was taken out. The rough size of the sintered body was 196.5 mm×197 mm×t68 mm and the bulk density thereof was 2.87 g/cm$^3$ (relative density of 91.1%). The sintering state was porous. When examining the microstructure of the inside of the sintered body, the structure was not compact and a trace of violent foaming resulting in porosity was observed.

As the evaluation results of the neutron moderation performance and characteristics of every kind, as shown in Table 2, a large quantity of fast neutrons having possibilities of adversely influencing the body remained in the neutron flux after moderation. There was a problem left that the moderation effect could not be sufficiently obtained. In addition, there was a problem of low mechanical strength.

Comparative Example 5

Using the same starting raw material as in the above Example 1, this raw material was filled into a mold form (mold size of 220 mm×220 mm×H150 mm) using a uniaxial press device, and compressed at a uniaxial press pressure of 4 MPa to be molded.

This press molded body (size of about 220 mm×220 mm×t85 mm) was put into a thick vinyl bag, and sealed after deairing. That was put into a molding part (inside size: inside diameter 350 mm×H120 mm) of a cold isostatic pressing (CIP) device. Clean water was filled into the space between the vinyl bag with this press molded body therein and the molding part of the CIP device and isostatic pressing was conducted at a molding pressure of 4 MPa, resulting in a CIP molded body (size of about 218 mm×218 mm×t75 mm).

Preliminary sintering at 550° C. for 5 hours in an air atmosphere was conducted on this molded body, so as to obtain a preliminary sintered body of about 211 mm×211 mm×t73 mm. This preliminary sintered body was heated from room temperature to 740° C. at a fixed rate for 6 hours in a nitrogen gas atmosphere, and the temperature was held there for 6 hours. It was then raised to 900° C. at a fixed rate for 2 hours and held there for 1 hour. Heating was then stopped, and the temperature was lowered by self-cooling (furnace cooling) for about 20 hours to 100° C. at which time it was previously set to take out the sintered body, after which it was taken out.

The bulk density of the sintered body calculated from the rough size (199 mm×199 mm×t68 mm) and the weight thereof was 2.86 g/cm$^3$ (relative density of 90.8%). The sintering state was slightly porous.

As the evaluation results of the neutron moderation performance and characteristics of every kind, as shown in Table 2, a large quantity of fast neutrons having possibilities of adversely influencing the body remained in the neutron flux after moderation. There was a problem left that the moderation effect could not be sufficiently obtained. In addition, there was a problem of low mechanical strength.

Comparative Example 6

Using the same starting raw material as in the above Example 1, this raw material was filled into a mold form (mold size of 220 mm×220 mm×H150 mm) using a uniaxial press device, and compressed at a uniaxial press pressure of 10 MPa to be molded.

This press molded body (size of about 220 mm×220 mm×t851 nm) was put into a thick vinyl bag, and sealed after deairing. That was put into a molding part (inside size: inside diameter 350 mm×H120 mm) of a cold isostatic pressing (CIP) device. Clean water was filled into the space between the vinyl bag with this press molded body therein and the molding part of the CIP device and isostatic pressing was conducted at a molding pressure of 20 MPa, resulting in a CIP molded body (size of about 215 mm×215 mm×t75 mm).

Preliminary sintering at 500° C. for 4 hours in an air atmosphere was conducted on this molded body so as to obtain a preliminary sintered body of about 211 mm×211 mm×t72 mm. This preliminary sintered body was heated from room temperature to 730° C. at a fixed rate for 6 hours in a nitrogen gas atmosphere, and the temperature was held there for 5 hours. It was then raised to 900° C. at a fixed rate for 2 hours and held there for 1 hour. Heating was then stopped, and the temperature was lowered by self-cooling (furnace cooling) for about 20 hours to 100° C. at which time it was previously set to take out the sintered body, after which it was taken out.

The bulk density of the sintered body calculated from the rough size (198 mm×198 mm×t68 mm) and the weight thereof was 2.85 g/cm$^3$ (relative density of 90.5%). The sintering state was insufficient and slightly porous.

As the evaluation results of the neutron moderation performance and characteristics of every kind, as shown in Table 2, a large quantity of fast neutrons having possibilities of adversely influencing the body remained in the neutron flux after moderation. There was a problem left that the moderation effect could not be sufficiently obtained. In addition, there was a problem of low mechanical strength.

Comparative Example 7

Using the same starting raw material as in the above Example 1, this raw material was filled into a mold form (mold size of 220 mm×220 mm×H150 mm) using a uniaxial press device, and compressed at a uniaxial press pressure of 4 MPa to be molded.

This press molded body (size of about 220 mm×220 mm×t85 mm) was put into a thick vinyl bag, and sealed after deairing. That was put into a molding part (inside size: inside diameter 350 mm×H120 mm) of a cold isostatic pressing (CIP) device. Clean water was filled into the space between the vinyl bag with this press molded body therein and the molding part of the CIP device and isostatic pressing was conducted at a molding pressure of 4 MPa, resulting in a CIP molded body (size of about 218 mm×218 mm×t75 mm).

Preliminary sintering at 550° C. for 5 hours in an air atmosphere was conducted on this molded body, so as to obtain a preliminary sintered body of 211 mm×211 mm×t72.5 mm. This preliminary sintered body was heated from room temperature to 740° C. at a fixed rate for 6 hours in a helium gas atmosphere, and the temperature was held there for 6 hours. It was then raised to 900° C. at a fixed rate for 2 hours and held there for 1 hour. Heating was then stopped, and the temperature was lowered by self-cooling (furnace cooling) for about 20 hours to 100° C. at which time it was previously set to take out the sintered body, after which it was taken out.

The bulk density of the sintered body calculated from the rough size (198 mm×198.5 mm×t67.5 mm) and the weight thereof was 2.89 g/cm$^3$ (relative density of 91.7%). The sintering state was slightly porous.

As the evaluation results of the neutron moderation performance and characteristics of every kind, as shown in Table 2, a large quantity of fast neutrons having possibilities of adversely influencing the body remained in the neutron flux after moderation. There was a problem left that the moderation effect could not be sufficiently obtained. In addition, there was a problem of low mechanical strength.

[Comparative Material: $CaF_2$]

A high-purity $CaF_2$ raw material (mean particle diameter of 20 μm and purity of 99.9% by weight or more) was pulverized using the pot mill and alumina balls to a high-purity $CaF_2$ powder (mean particle diameter of 1.4 μm and purity of 99.9% by weight or more). To the powder, a carboxymethyl cellulose (CMC) solution was added as a sintering aid in the proportion of 0.2% by weight to 100 of the $CaF_2$ powder, and mixed in the pot mill for 12 hours to be a starting raw material.

This raw material was filled into a mold form (mold size of 220 mm×220 mm×H150 mm) using a uniaxial press device and compressed at a uniaxial press pressure of 10 MPa to be molded.

This press molded body (size of about 220 mm×220 mm×t85 mm), which was put into a thick vinyl bag and sealed after deairing, was put into a molding part (inside size: inside diameter 350 mm×H120 mm) of a cold isostatic pressing (CIP) device. Clean water was filled into the space between the vinyl bag with this press molded body therein and the molding part of the CIP device, and isostatic pressing was conducted at a molding pressure of 20 MPa, leading to a CIP molded body (size of about 215 mm×215 mm×t75 mm).

Preliminary sintering at 600° C. for 6 hours in an air atmosphere was conducted on the molded body, so as to obtain a preliminary sintered body having a size of about 208 mm×28 mm×t72 mm.

This preliminary sintered body was heated from room temperature to 870° C. at a fixed rate for 6 hours in a nitrogen atmosphere, and the temperature was held there for 6 hours. It was then raised to 1100° C. at a fixed rate for 2 hours and held there for 1 hour. Heating was then stopped, and the temperature was lowered by self-cooling (furnace cooling) for about 20 hours to 100° C. at which time it was previously set to take out the sintered body, after which it was taken out.

The bulk density of the $CaF_2$ sintered body was calculated at 3.05 g/cm$^3$ (relative density of 95.9%, and the true density of $CaF_2$ is 3.18 g/cm$^3$) from the rough size (193 mm×193 mm×t62 mm) and the weight thereof. The sintering state was good.

As the evaluation results, a sintered body in a compact sintering state could be obtained and the mechanical strength was sufficient as shown in Table 2. However, since a large quantity of fast neutrons remained, there was a big problem of the moderation performance to neutrons left. This result indicated that a $CaF_2$ sintered body was inferior to a $MgF_2$ sintered body in characteristics as a moderator even if the $CaF_2$ sintered body was sufficiently compact.

INDUSTRIAL APPLICABILITY

It is possible to be used as a moderator to restrict the radiation velocity of radioactive rays of every kind such as neutrons.

The invention claimed is:

1. A neutron moderator comprising a fluoride sintered body, wherein the fluoride sintered body has a thickness of 60 mm or more and 64 mm or less and comprises $MgF_2$ of a compact polycrystalline structure having a bulk density of 2.90 g/cm$^3$ or more and 3.07 g/cm$^3$ or less and a bending strength of 10 MPa or more and 25 MPa or less as regards mechanical strengths.

2. The neutron moderator according to claim 1, wherein the sintered body has a Vickers hardness of 71 or more and 120 or less as regards mechanical strengths.

3. The neutron moderator according to claim 1, wherein the sintered body has volume of 2,183 cm$^3$ or more and 2,421 cm$^3$ or less.

4. A neutron moderator comprising a fluoride sintered body, wherein the fluoride sintered body has a thickness of 60 mm or more and 64 mm or less and comprises $MgF_2$ of a compact polycrystalline structure having a bulk density of 2.90 g/cm$^3$ or more and 3.07 g/cm$^3$ or less and a bending strength of 10 MPa or more and 25 MPa or less as regards mechanical strengths, wherein the sintered body is produced by a process comprising the steps of:
pulverizing a high-purity $MgF_2$ raw material and mixing it with 0.03-0.5% by weight of a sintering aid:
molding the resulting mixture obtained after the mixing step at a molding pressure of 5 MPa or more using a uniaxial press device and subsequently
at a molding pressure of 5 MPa or more using a cold isostatic pressing (CIP) device to obtain a molded article;
conducting preliminary sintering of the molded article in the temperature range of 550° C.-600° C. for 4-10 hours in an air atmosphere;
heating in the temperature range of 750° C.-840° C. for 5-12 hours in an inert gas atmosphere; and
conducting main sintering by heating in the temperature range of 900° C.-1100° C. for 0.5-3 hours in the same atmosphere as the preceding step so as to form $MgF_2$ sintered body having a compact structure.

5. The neutron moderator according to claim 4, wherein the sintered body has a Vickers hardness of 71 or more and 120 or less as regards mechanical strengths.

6. The neutron moderator according to claim 4, wherein the sintering aid is selected from the group consisting of carboxymethyl cellulose and calcium stearate.

7. The neutron moderator according to claim 4, wherein the sintered body has volume of 2,183 cm$^3$ and 2,421 cm$^3$ or less.

* * * * *